US008335744B2

(12) United States Patent
Haas et al.

(10) Patent No.: US 8,335,744 B2
(45) Date of Patent: Dec. 18, 2012

(54) SYSTEM AND METHOD FOR PAPER INDEPENDENT COPY DETECTION PATTERN

(75) Inventors: Bertrand Haas, Cambridge, MA (US); Ahmet Emir Dirik, Brooklyn, NY (US)

(73) Assignee: Pitney Bowes Inc., Stamford, CT (US)

( * ) Notice: Subject to any disclaimer, the term of this patent is extended or adjusted under 35 U.S.C. 154(b) by 845 days.

(21) Appl. No.: 12/317,994

(22) Filed: Dec. 31, 2008

(65) Prior Publication Data

US 2010/0080471 A1     Apr. 1, 2010

Related U.S. Application Data

(60) Provisional application No. 61/100,530, filed on Sep. 26, 2008.

(51) Int. Cl.
*G06K 9/64* (2006.01)
*G06Q 90/00* (2006.01)
(52) U.S. Cl. ................. 705/57; 382/217; 726/2
(58) Field of Classification Search .............. 705/57; 382/217; 726/2
See application file for complete search history.

(56) References Cited

U.S. PATENT DOCUMENTS

| | | | |
|---|---|---|---|
| 6,454,174 B1 | 9/2002 | Sansone | |
| 6,538,757 B1 | 3/2003 | Sansone | |
| 6,779,720 B2 | 8/2004 | Lewis | |
| 6,782,116 B1 | 8/2004 | Zhao et al. | |
| 6,854,651 B2 | 2/2005 | Smith et al. | |
| 6,889,098 B1 | 5/2005 | Laval et al. | |
| 6,959,100 B2 | 10/2005 | Rhoads | |
| 6,965,997 B2 | 11/2005 | Dutta | |
| 6,971,009 B2 | 11/2005 | Dutta | |
| 6,971,030 B2 | 11/2005 | Dutta | |
| 6,996,249 B2 | 2/2006 | Miller et al. | |
| 7,016,516 B2 | 3/2006 | Rhoads | |
| 7,043,052 B2 | 5/2006 | Rhoads | |
| 7,047,205 B2 | 5/2006 | Hale et al. | |
| 7,054,461 B2 * | 5/2006 | Zeller et al. ................... | 382/100 |
| 7,076,082 B2 * | 7/2006 | Sharma ........................ | 382/100 |

(Continued)

FOREIGN PATENT DOCUMENTS

WO     WO03/071481 A2 *   8/2003

OTHER PUBLICATIONS

Amiri et al. ("An algorithm used for modeling print and scan operations used for watermarking", Department of Computer Engineering, Sharif University of Technology, Sep. 26, 2009, 12 pages).*

*Primary Examiner* — James D Nigh
(74) *Attorney, Agent, or Firm* — George M. Macdonald; Charles R. Malandra, Jr.; Steven J. Shapiro

(57) ABSTRACT

Systems and methods for detecting copies of documents are described. In one example, a system and method for detecting copies of documents utilizes multiple authentication tests performed using original and scanned copy detection patterns. The system captures a CDP that may be skewed or improperly sized. The system also retrieves or reconstitutes the expected CDP. Then the system performs a first correlation to determine if the captured CDP indicates the correct document identification and then if necessary, one or more authentication tests are applied wherein the authentication test may be grouped into distinct orthogonal test groups. The authentication tests applied may be selected according to usefulness, system throughput or target document valuation parameters.

16 Claims, 19 Drawing Sheets

U.S. PATENT DOCUMENTS

| | | |
|---|---|---|
| 7,113,596 B2 | 9/2006 | Rhoads |
| 7,120,603 B2 | 10/2006 | Kodaka et al. |
| 7,152,786 B2 | 12/2006 | Brundage et al. |
| 7,222,080 B2 | 5/2007 | Hale et al. |
| 7,231,061 B2 | 6/2007 | Bradley |
| 7,245,740 B2 | 7/2007 | Suzaki |
| 7,305,104 B2 | 12/2007 | Carr et al. |
| 7,330,563 B2 | 2/2008 | Rhoads |
| 7,349,555 B2 | 3/2008 | Rhoads |
| 7,400,932 B2 | 7/2008 | Ackley et al. |
| 7,477,739 B2 | 1/2009 | Haitsma et al. |
| 7,787,152 B2 * | 8/2010 | Haas et al. .................. 358/3.28 |
| 7,937,588 B2 * | 5/2011 | Picard et al. .................. 713/176 |
| 2003/0156733 A1 * | 8/2003 | Zeller et al. ................... 382/100 |
| 2006/0126094 A1 | 6/2006 | Haas et al. |
| 2007/0076239 A1 * | 4/2007 | Haas et al. .................. 358/1.14 |
| 2007/0136213 A1 | 6/2007 | Sansone et al. |
| 2008/0301767 A1 * | 12/2008 | Picard et al. ....................... 726/2 |

* cited by examiner

SYSTEM AND METHOD FOR PAPER INDEPENDENT COPY DETECTION PATTERN

CROSS REFERENCE TO RELATED APPLICATIONS

This application claims priority under 35 U.S.C. section 119(e) from Provisional Patent Application Ser. No. 61/100,530, filed Sep. 26, 2008, entitled System and Method for Paper Independent Copy Detection Pattern by Bertrand Haas, et al., which is incorporated herein by reference in its entirety.

FIELD OF THE INVENTION

The present invention relates to systems and methods for detecting copies of documents, and in certain particular embodiments, to systems and methods for detecting copies of documents using multiple authentication tests to provide an efficient and robust verification system for scanned copy detection patterns across varied media.

BACKGROUND OF THE INVENTION

Digital technology has become pervasive in the creation and distribution of many types of media. For example, valuable audio and video content is distributed in digital form both electronically and embodied in a carrier media. Similarly, documents may be created and distributed in digital form both electronically and embodied in a carrier media such printed paper. Content owners may wish to provide identification, authentication and non-repudiation for certain documents transmitted in electronic form. Furthermore, many valuable documents are produced and distributed in paper form. Various technologies are now readily available for making high-quality copies of documents. As a result, unauthorized copying and counterfeiting of documents such as bank notes, checks, and identification documents is a serious concern.

Moreover, the pervasive nature of the Internet allows easier and anonymous access to sources of counterfeit documents. There are many image capture systems such as CCD cameras, drum scanners, flatbed scanners and other capture/scanning systems that are readily available and that provide excellent reproduction accuracy and precision. Similarly, general-purpose personal computers have the capacity to run powerful digital media editing software that is also readily available. Furthermore, very accurate and precise monochrome and color printing systems are readily available for outputting such unauthorized copies and counterfeit documents. Several technologies are available to thwart the unauthorized copying or counterfeiting of documents including UV ink, holograms, and OVDs (Optical Variable Devices). Such techniques may be relatively inexpensive, but may rely on human operator judgment and may not be reliable. Documents may also be tagged using RFID or DNA tagging technologies. Such techniques may be reliable, but may be relatively expensive.

Several types of physical document copy detection systems are known including copy detection patterns (CDPs) that may be placed in a particular region of a document reserved for the purpose. Furthermore, several copy detection systems are known that utilize visible and invisible digital watermarks that are applied to an actual image or document. Commercially available systems include those available from Digimarc Corporation of Beaverton, Oreg. and Mediasec Technologies, LLC of Providence, R.I. For example, a system for using a continuously varying tone graphic field for copy detection is described in U.S. Pat. No. 6,454,174 entitled Method for Reading Electronic Tickets, issued Sep. 24, 2002 to Ronald P. Sansone. Furthermore, U.S. Pat. No. 6,782,116 B1 issued Aug. 24, 2004 to Jian Zhao, et al. describes watermark systems and is titled Apparatus and Methods for Improving Detection of Watermarks in Content that has Undergone a Lossy Transformation.

However, traditional copy detection patterns may not be effective across a variety of paper types. Accordingly, there is a need for a copy detection pattern based copy detection system that provides robust copy detection across multiple paper types. Accordingly, there are several disadvantages of currently available systems and methods for detecting counterfeit documents using copy detection patterns.

SUMMARY

The illustrative embodiments of the present application describe systems and methods for detecting copies of documents, and in certain particular embodiments, to systems and methods for detecting copies of documents using multiple authentication tests that may be weighted and/or cascaded to provide an efficient and robust verification threshold for scanned copy detection patterns across varied media.

In one illustrative configuration, systems and methods for determining if a document is an original version are described. The system captures a CDP that may be skewed or improperly sized. The system then retrieves or reconstitutes the expected CDP. In order to provide a more reliable comparison and without manipulating the captured CDP, the system manipulates the orientation or rotation and resolution or size of the retrieved or reconstituted CDP to more closely correspond to the skewed orientation and incorrect size of the captured CDP. The system then performs an identification test to ensure that the correct CDP is under test. Then one or more authentication tests are preformed to determine if the document is an original version. The authentication tests may be selected from an entropy test, a fourier domain sharpness test, a wavelet domain sharpness test and a prediction error metric test.

In a further illustrative configuration, the authentication tests may be grouped into distinct orthogonal test group categories. If a test in one category provides an inconclusive result, then a test from an orthogonal category may be used to provide a more accurate test. In yet a further illustrative configuration, a subset of authentication tests applied may be selected according to a selection parameter that may be determined using one or more of a usefulness parameter, a system throughput/speed parameter and/or a target document valuation parameter. Alternatively, one or more authentication tests may be randomly selected. Several additional alternative configurations are also described below.

BRIEF DESCRIPTION OF THE DRAWINGS

The accompanying drawings illustrate several embodiments of the application, and together with the general description given above and the detailed description given below, serve to explain certain principles of the invention. As shown throughout the drawings, like reference numerals designate like or corresponding parts.

DETAILED DESCRIPTION

Figure 1:
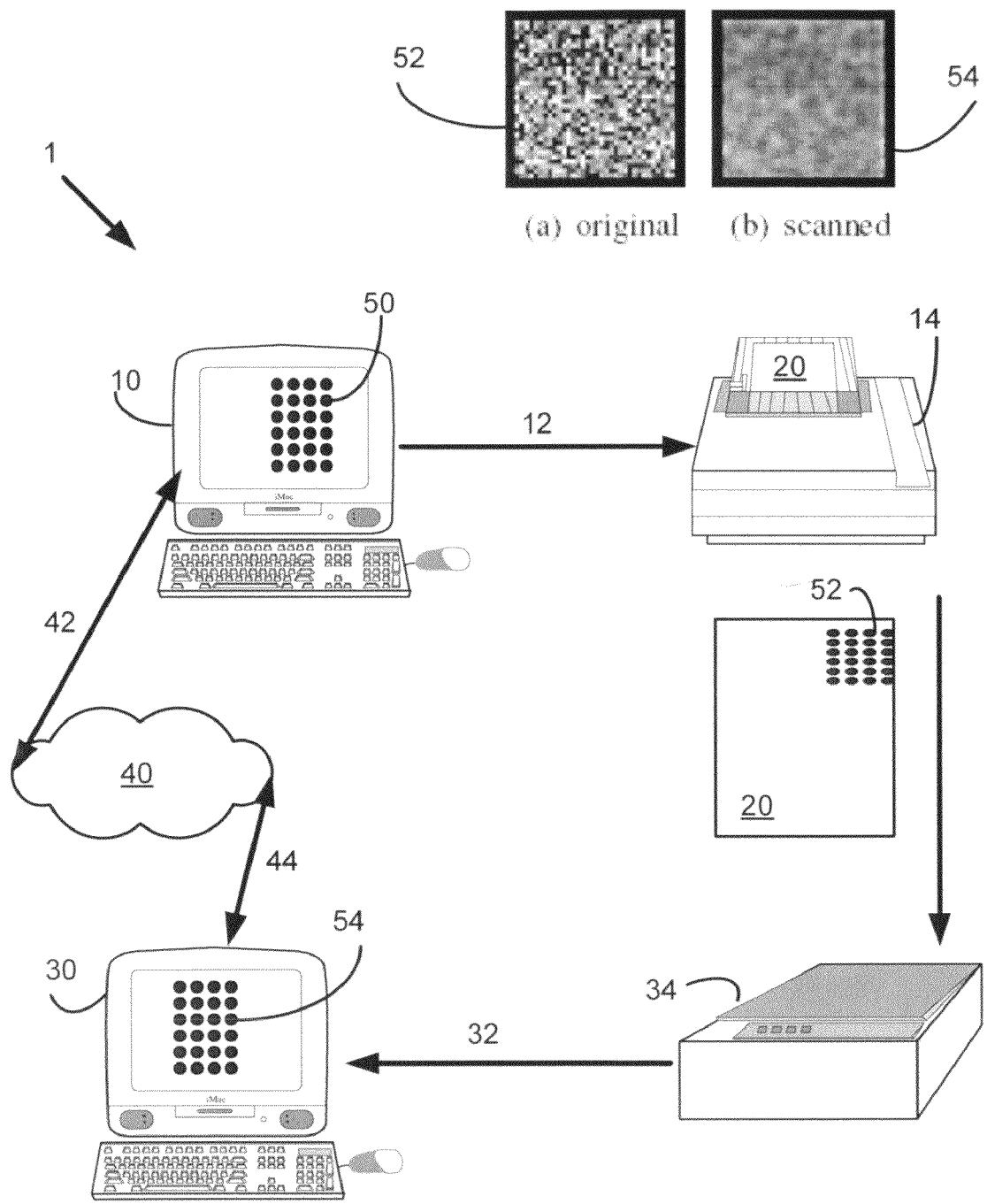
FIG. 1 is a block diagram of a system for detecting copies of documents according to an illustrative embodiment of the present application.

Certain copy detection systems that use copy detection patterns are commercially available from at least Mediasec Technologies, LLC. Digital watermark systems have been typically used in the so called electronic world in which a digital electronic file such as an image file in a particular format or a digital music or other media content format is watermarked and intended to be sent to a digital file player. For example, a digital file representing a source image may be represented digitally as a two dimensional array of 256 level gray-scale pixels. In such a situation, the source image may be considered a grayscale cover image that may be processed to reduce its range to grayscale values of 20-235. A watermark source image of the same dimensions may be created having random gray levels. The watermark source image may then be reduced to a grayscale range of 0-40 (the strength of the watermark) and then shifted to a range of −20 to 20 to create a watermark image. Thereafter, the cover image and watermark image can be added to create a watermarked source image. Such a watermark can later be retrieved from the image for various purposes.

While digital watermarks are sometimes used to secure physical manifestations of digital content such as printed images, copy detection patterns are also used for securing physical representations of digital content such as a printed document. In many implementations, a copy detection pattern (CDP) consists of a rectangle or other shaped area filled with pixels of random gray levels that are intended for a reserved printed area of the physical document. Copy-detection patterns (CDPs) have been described that include a digital image generated pseudo-randomly using a secret seed and/or cryptographic secret key. Such patterns are described as being designed to be sensitive to any scanning and printing process and as based on an information loss principle. For example, every time an image is printed or scanned, some information is lost about the original digital image due to physical characteristics of the printing and scanning systems. CDPs have been demonstrated using different printing technologies (offset, laser printer, dye sublimation, etc.) and different image capture/scanning technologies (photocopy, high resolution scanners, etc). Certain copy detection patterns may be thought of as a digital watermark of maximum strength and without a cover image.

However, traditional copy detection patterns may not be effective across a variety of paper types. Accordingly, there is a need for a copy detection pattern based copy detection system that provides robust copy detection across multiple paper types. Illustrative embodiments described herein provide alternative copy detection pattern copy detection systems and methods. Copy detection systems typically rely on the lossy transformations presented by the physical mechanisms involved with making an unauthorized copy. For example, in the printing and scanning process, even the most technologically advanced hardware systems will introduce some distortion or error into the process. In the scanning or image capture process, a typical scanner grid is usually not aligned exactly on the printed grid of the scanned document. It would usually scan a mix of two to four pixels of the original document thereby mixing the gray levels of those pixels. Similarly, printing technologies introduce error. In an ink jet printing system, ink usually spreads from the intended pixel to neighboring pixels. In a thermal printing process, thermal history and neighbor heat effects cause a mixing of gray levels among neighboring pixels.

Referring to FIG. 1 a block diagram of an improved system for detecting copies of documents 1 according to an embodiment of the present application is shown. The processes described are programmed into the representative equipment described here as appropriate. A document and original digital CDP 50 creation system 10 is connected to a printer 14 using communications channel 12 such as a USB cable. The system applies a seal (the Copy Detection Pattern—or CDP) on a document. The CDP creation personal computer 10 creates an original digital CDP that can be created using several algorithms.

In this embodiment, the original digital CDP 50 is created using the SHA-1 algorithm with a key and information from the underlying document that is to be protected. The resulting CDP is a rectangle filled with pixels of pseudo-random gray levels. Alternatively, other shapes and algorithms may be used. The digital CDP is then included somewhere in the digital document 20 and typically in an area reserved on the document. The document 20 is then printed with a given type of printer 14 (the official printer). In an alternative, the original document already exists and is placed in the printer 14 so that the printed CDP 52 can be applied. For example, the CDP may be created as a hash of the document and may be protected with a secret key. See U.S. patent application Ser. No. 11/011,829.

The printer 14 may be used to print the entire contents of document 20 or just the printed CDP 52. The printed CDP 52 will typically occupy a dedicated portion of the document 20 such as the top right corner depicted as the region of interest for the CDP. The CDP protected document 20 then enters circulation until reaching the verification scanner 34. Unfortunately, while in circulation, unscrupulous individuals might make an unauthorized copy of the document 20. Such fraudulent copies are usually scanned and reprinted with high quality devices. The document (or its unauthorized copy) is then scanned at the verification system with a given type of scanner 34 (the official scanner) and the image of the scanned CDP 54 is analyzed to detect whether it (and therefore the whole document or the part of the document to be protected if the CDP was created as a hash of a portion of the document) has been copied or not.

The scanner 34 is connected to the verification personal computer 30 using communications channel 32 such as a USB cable. In an alternative, the scanner is an image capture device such as a CCD camera. The personal computers 10, 30 are DELL, PENTIUM 4 based computers running WINDOWS XP with 2 GB ram, 200 GB hard drives, wired and wireless networking and several USB 2 ports for connecting scanners and printers. The applications described herein are programmed in MATLAB, but could alternatively be programmed in a general-purpose high-level computer language such as C++ or assembly code. Other known computing systems, programming systems, communications systems and security systems may be utilized.

The personal computer 10 runs the original CDP creation program and the verification computer 30 runs the CDP comparison copy detection program. It is assumed that the original digital CDP 50 is available at the verification computer 30. The original digital CDP 50 could be transmitted from the CDP creation computer 10 to the verification computer 30 using communication channels 42, 44 and network 40. Network 40 comprises the Internet, but other networks may be used. Alternatively, the original CDP 50 could be sent through an intermediary such as a trusted third party (not shown). In yet another alternative, the key used to generate CDP 50 may be transmitted to the verification computer 30 or otherwise recovered such as by recovering the key from elsewhere on document 20. In such an alternative, the verification computer 30 would reconstitute the original CDP 50 locally using the recovered key. In the embodiment described using the SHA-1 digital signature algorithm, the key would be used with the contents of document 20 to reconstitute the original CDP 50.

Traditional copy detection pattern systems typically print a pattern of random grey level pixels on a dedicated portion of a document such as a rectangle using a pseudo random generator with a secret seed. A relatively robust copy detection pattern (CDP) system was described in commonly-owned, co-pending U.S. patent application Ser. No. 11/240,889 filed Sep. 30, 2005 by Haas, et al., entitled Copy Detection System Using Correlations of Copy Detection Patterns, the application incorporated herein by reference in its entirety ("'889 application"). In that system, two verification tests may be utilized. The first one is an "identification test", is the one described above, and is used more to make sure the scanned CDP is the one expected from the given seed than for proper copy detection. The second one, the "authentication test", is the one mainly used for proper copy detection. An autocorrelation number is computed from the scanned CDP and matched with an experimentally pre-determined threshold. If the number is below the threshold, the printed CDP is deemed legitimate, otherwise it is deemed a copy. Indeed the original digital CDP has an autocorrelation number close to zero, but every time it is printed and scanned (on a good quality paper), the mixing of grey levels increases the number. The threshold is experimentally set so that the number after one print and scan is below, and after two it is above.

A potential attacker in this simplified example might somehow come into possession of an original physical document 20 with the security CDP seal 52. The attacker would then use his own scanner to obtain a copy of the security CDP seal 52 and the original physical document. In a first detailed attack scenario, the attacker obtains a high quality scan of the CDP and document and then prints a fraudulent copy. In a second detailed attack scenario, the attacker obtains a high quality scan of the document and CDP and then applies post-processing to the scanned fraudulent CDP and then print an unauthorized copy of the original physical document with the fraudulent CDP. For example, with reference to FIGS. 2A, 2B, 3A, 3B, 4A, 4B, 5A, 5B and 6, a first detailed potential attack scenario against the 4 point correlation test on different papers is described below. Next, with reference to FIGS. 7 and 8, a second detailed potential attack scenario or "smart attack" against the 4 point correlation test is described and shown along with data from the first attack. Thereafter, with reference to FIGS. 9-13, several illustrative novel copy detection processing tests are described with reference to results against the two previously described detailed attacks. Thereafter, with reference to the system of FIG. 1 and the process of FIGS. 14A and 14B, several illustrative improved novel combination copy detection processes are described using combinations of the prior tests and the novel tests described above.

Figure 2A:
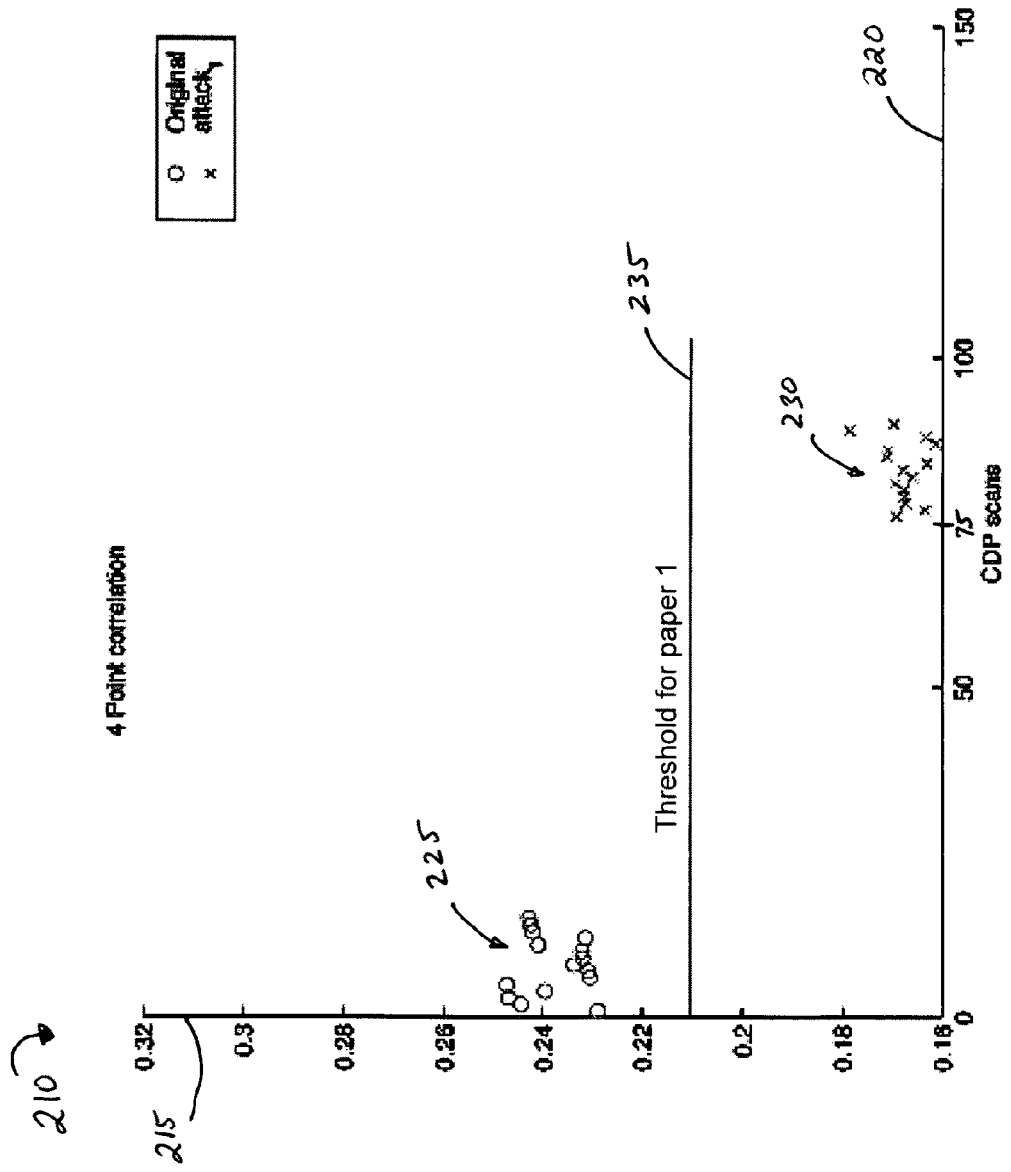
FIG. 2A is a graph illustrating multiple instances of a copy detection test using a four point correlation test for a first paper according to an illustrative embodiment of the present application.
Figure 2B:
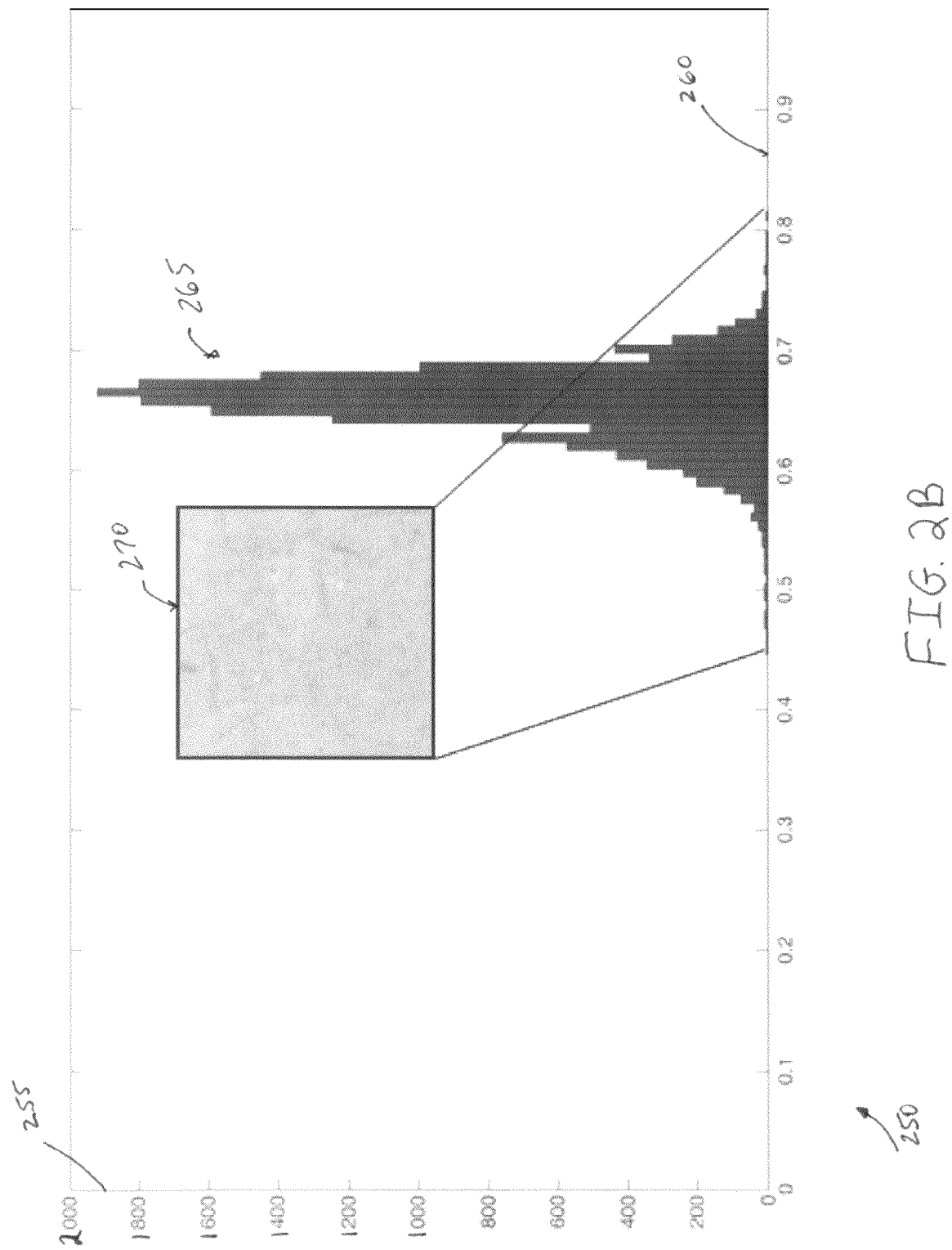
FIG. 2B is a graph illustrating a histogram of grey levels taken from a sample of the media under test in FIG. 2A.
Figure 3A:
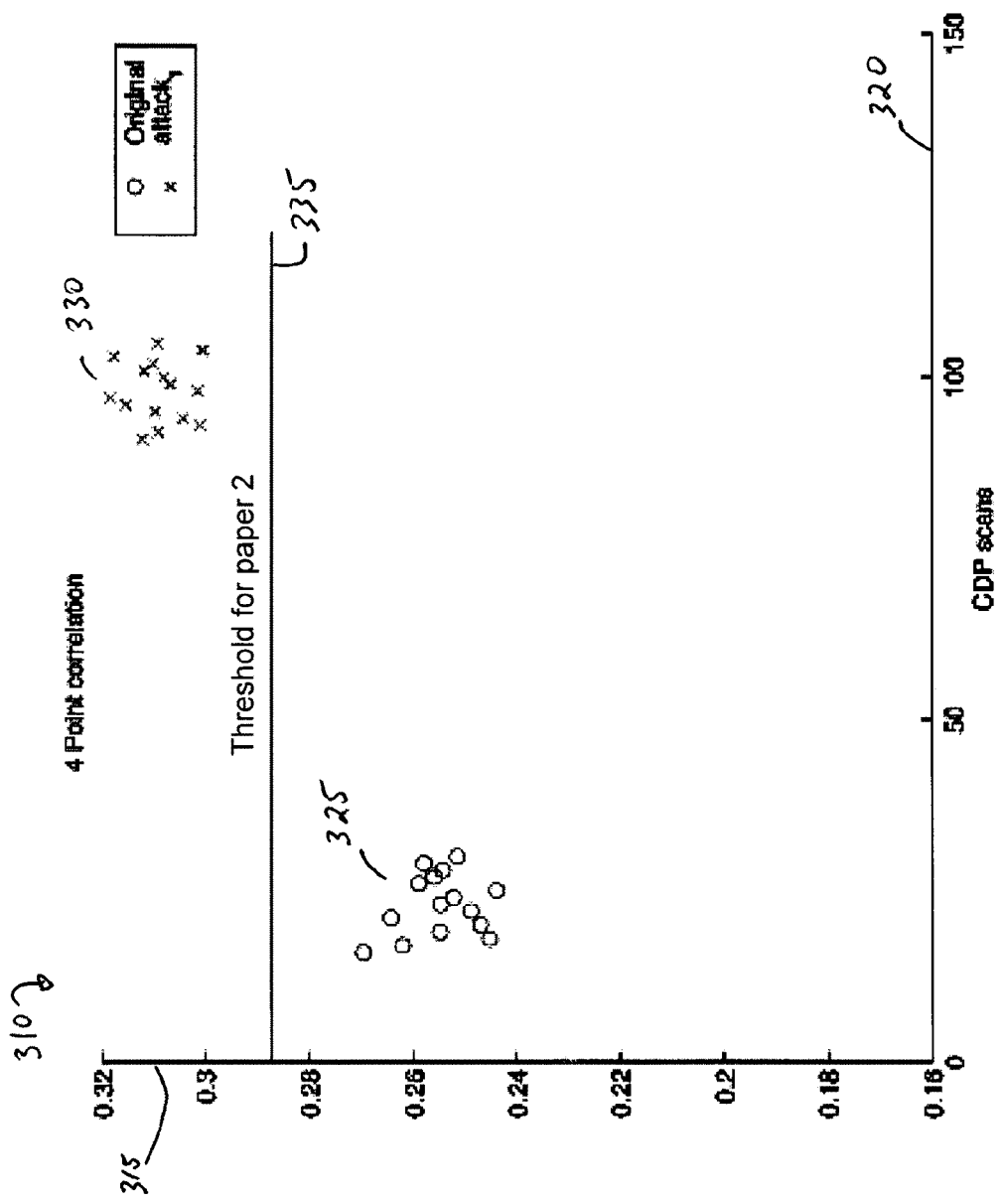
FIG. 3A is a graph illustrating multiple instances of a copy detection test using a four point correlation test for a second paper according to an illustrative embodiment of the present application.
Figure 3B:
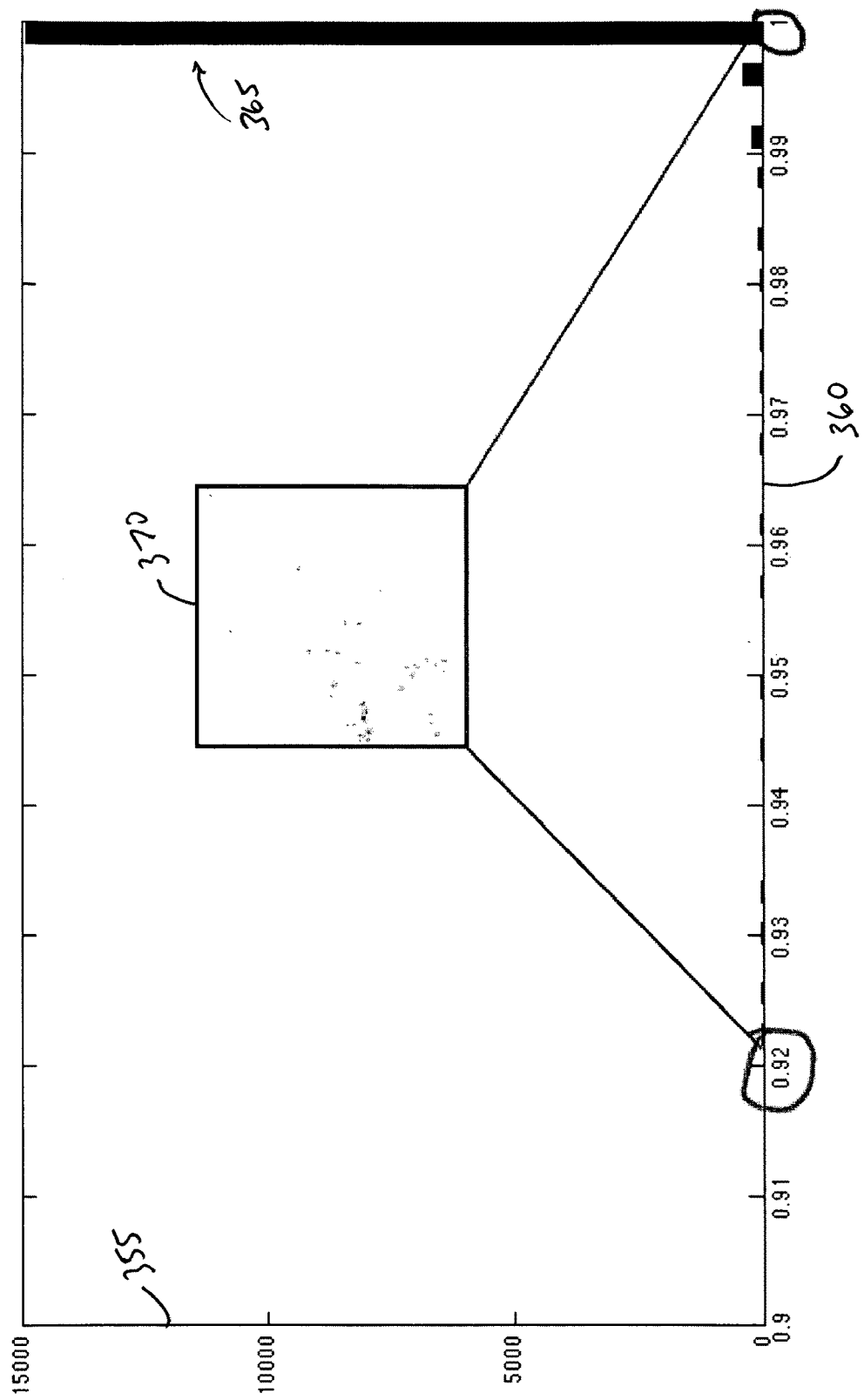
FIG. 3B is a graph illustrating a histogram of grey levels taken from a sample of the media under test in FIG. 3A.
Figure 4A:
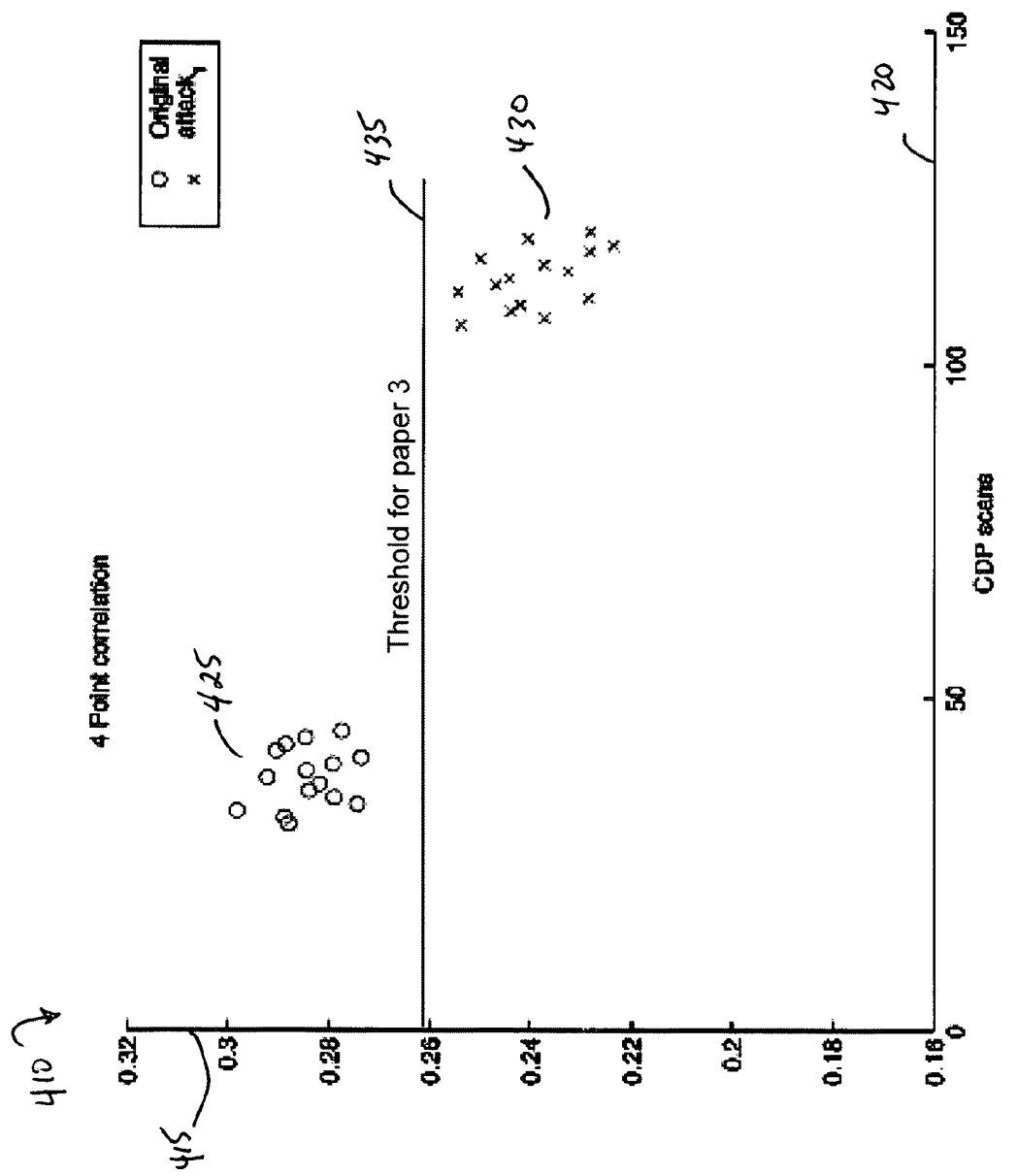
FIG. 4A is a graph illustrating multiple instances of a copy detection test using a four point correlation test for a third paper according to an illustrative embodiment of the present application.
Figure 4B:
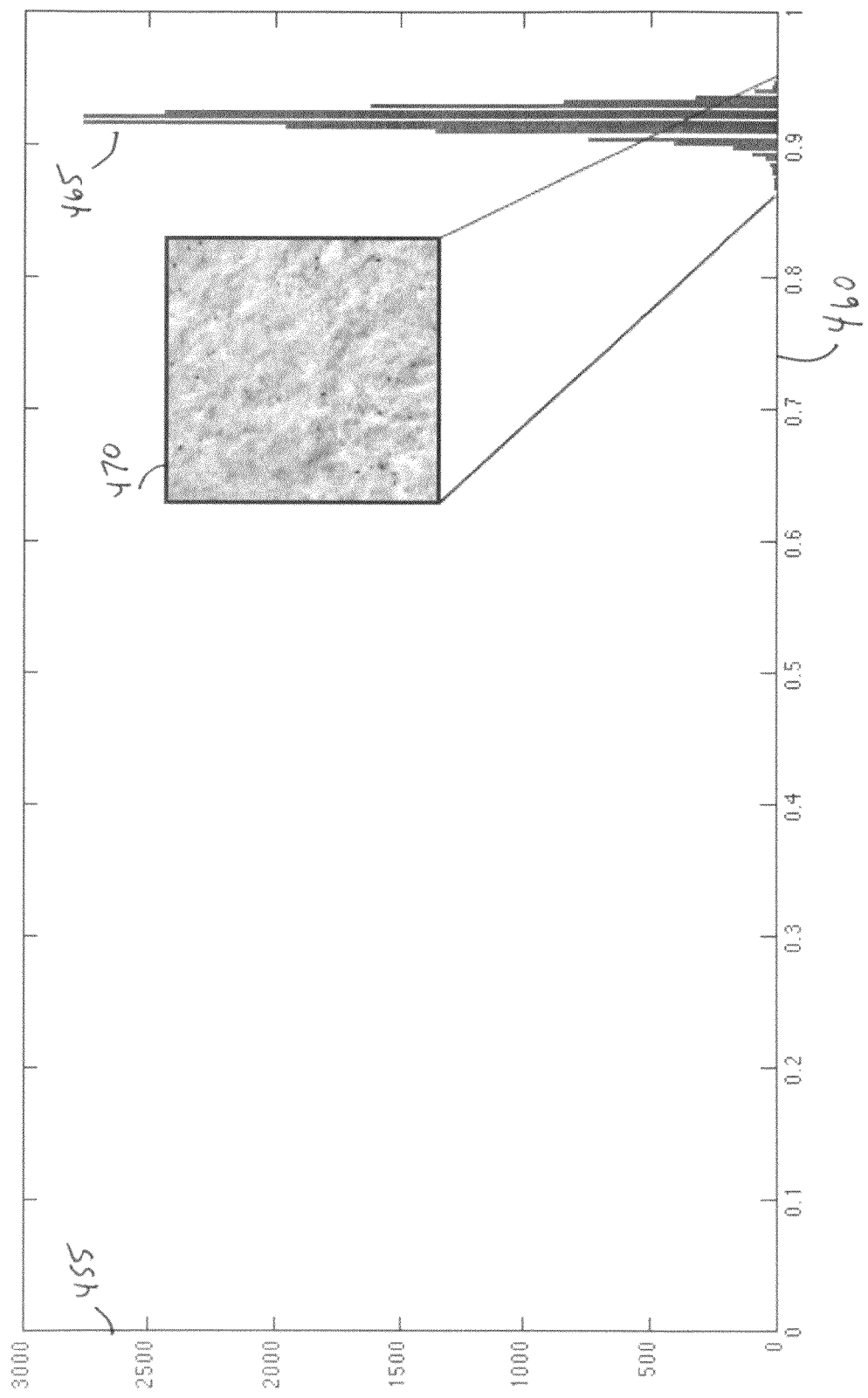
FIG. 4B is a graph illustrating a histogram of grey levels taken from a sample of the media under test in FIG. 4A.
Figure 5A:
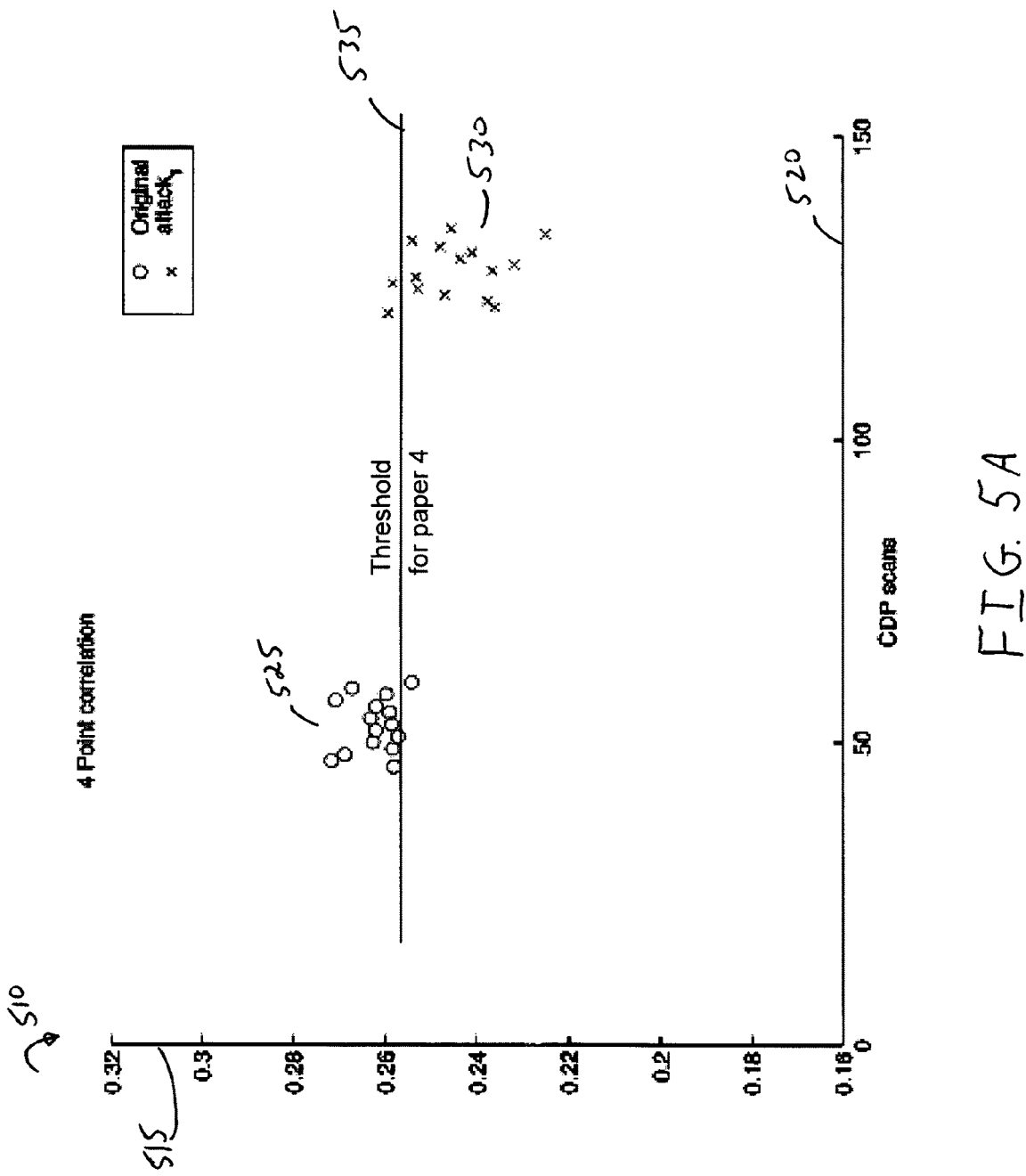
FIG. 5A is a graph illustrating multiple instances of a copy detection test using a four point correlation test for a fourth paper according to an illustrative embodiment of the present application.
Figure 5B:
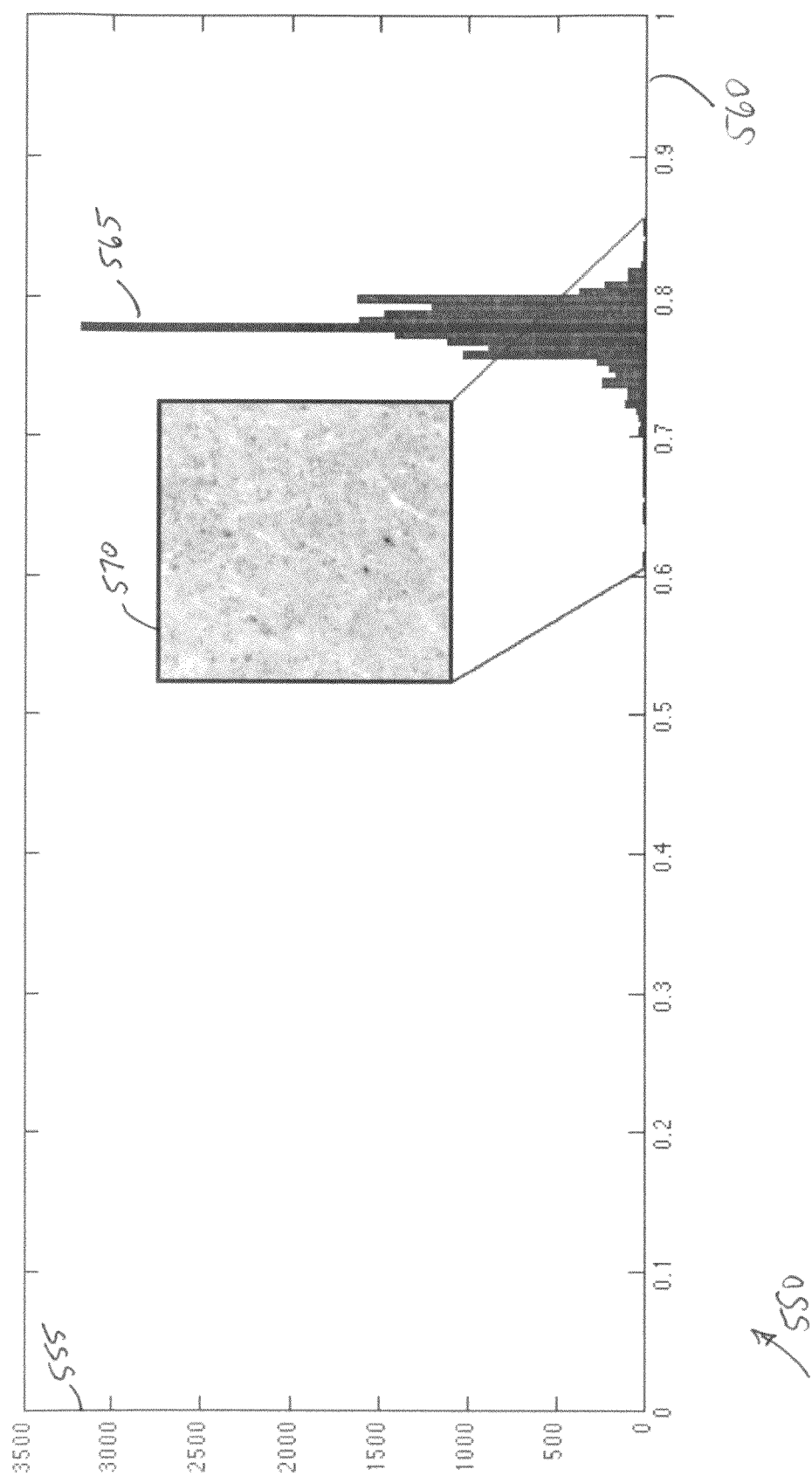
FIG. 5B is a graph illustrating a histogram of grey levels taken from a sample of the media under test in FIG. 5A.
Figure 6:
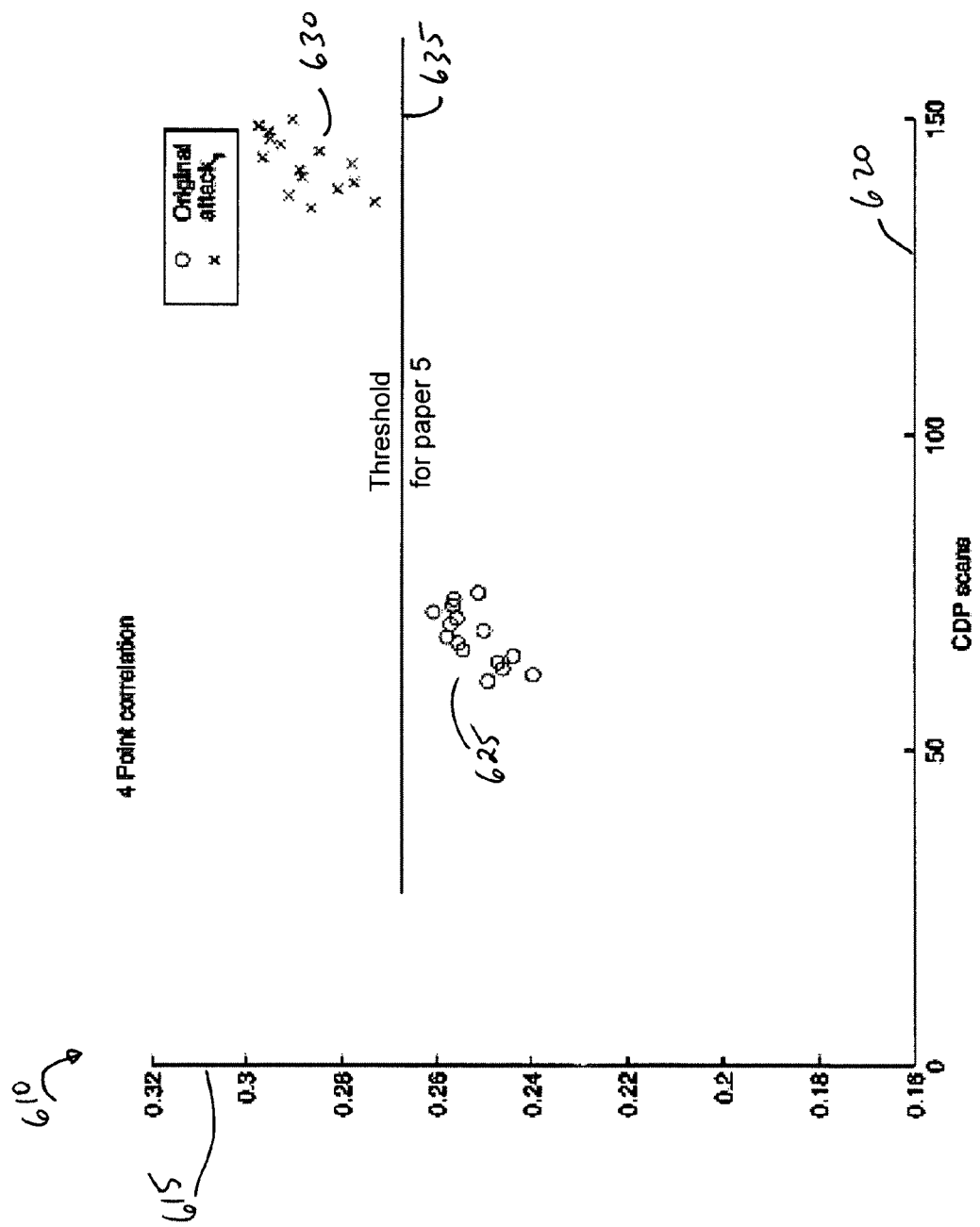
FIG. 6 is a graph illustrating multiple instances of a copy detection test using a four point correlation test for a fifth paper according to an illustrative embodiment of the present application.

Referring to FIGS. 2A, 2B, 3A, 3B, 4A, 4B, 5A, 5B and 6, a first detailed potential attack scenario against the 4 point correlation test on different papers is described. Experiments have shown that the multi-point autocorrelation number test (e.g., 4-point) is a rather good indicator of the number of print-scans (greater than 1 indicated scan should typically indicate a fraudulent copy), but that such a test is rather good only for a given type of paper (and a given type of printing). For example, FIGS. 3A and 6 represent good quality paper. When using a good quality type of paper (e.g., high homogeneity, and low noise variance), the multi-point autocorrelation number test works as described in the earlier '889 application (the print-scan process increases the autocorrelation for each successive generation of print-scan processing). Interestingly, FIGS. 2A, 4A and 5A represent textured papers that show sufficient sample separation for an effective test. When using textured paper (high heterogeneity), the multi-point autocorrelation number test works as effective for selection of fraudulent copies (however, in an opposite way as generally described in the '889 application since the print-scan process decreases the autocorrelation).

Indeed, referring to the histogram of FIG. 3B, it is shown that a good quality blank paper has a low autocorrelation (due mainly to its sensitivity to the scanner noise), and the printing and scanning of a zero autocorrelation pattern (the CDP), by mixing the grey levels of adjacent pixels, results in an increased autocorrelation pattern. However, in contrast, the histograms of FIGS. 2B, 4B and 5B represent a blank textured paper that has a high autocorrelation (inhomogeneities, such as fibers, span several adjacent pixels); since the consecutive print-scan processes tend to homogenize the grey levels, the paper texture comes out more distinctly and the autocorrelation tends to decrease. Additionally, other factors than the texture, such the filler used in the fabrication of paper, influence the ink-paper interaction and therefore influence as well the behavior of the autocorrelation number. This competing behavior of the autocorrelation of the CDP versus the autocorrelation of the paper causes the authentication part of the CDP verification to be unreliable on certain paper types (low texture paper in particular as shown in FIG. 5) and therefore, mostly unreliable when an unknown variety of paper types is used.

Referring to FIGS. 2A, 3A, 4A, 5A and 6, each provide a plot of original and first attack results 210, 310, 410, 510 and 610. Each plot includes a "y" axis of 4 point correlation test values 215, 315, 415, 515 and 615. Each plot includes an "x" axis that represents an individually numbered test (each vertical "slice" is a separate test). 220, 320, 420, 520 and 620. Each plot includes original CDP test values 225, 325, 425, 525 and 625. Each plot also includes the attack 1 CDP test values created by first making a high quality scan-print fraudulent copy and then testing 230, 330, 430, 530 and 630. Finally, each plot has an experimentally defined threshold for the paper that in most cases provides complete selectivity between the original and the attack 1 tests 235, 335, 435, 535 and 635.

Referring to FIGS. 2B, 3B, 4B and 5B, each provide a plot of a histogram of a scan of the blank paper under test 250, 350, 450 and 550. The "y" axis is a number of pixels 255, 355, 455 and 555. The "x" axis is a scan value normalized from 0-1 (partial axis shown when region is compressed) 260, 360, 460 and 560. Each plot has a representation of the paper under test 270, 370, 470 and 570. Finally, each plot has the histogram 265, 365, 465 and 565.

Figure 7:
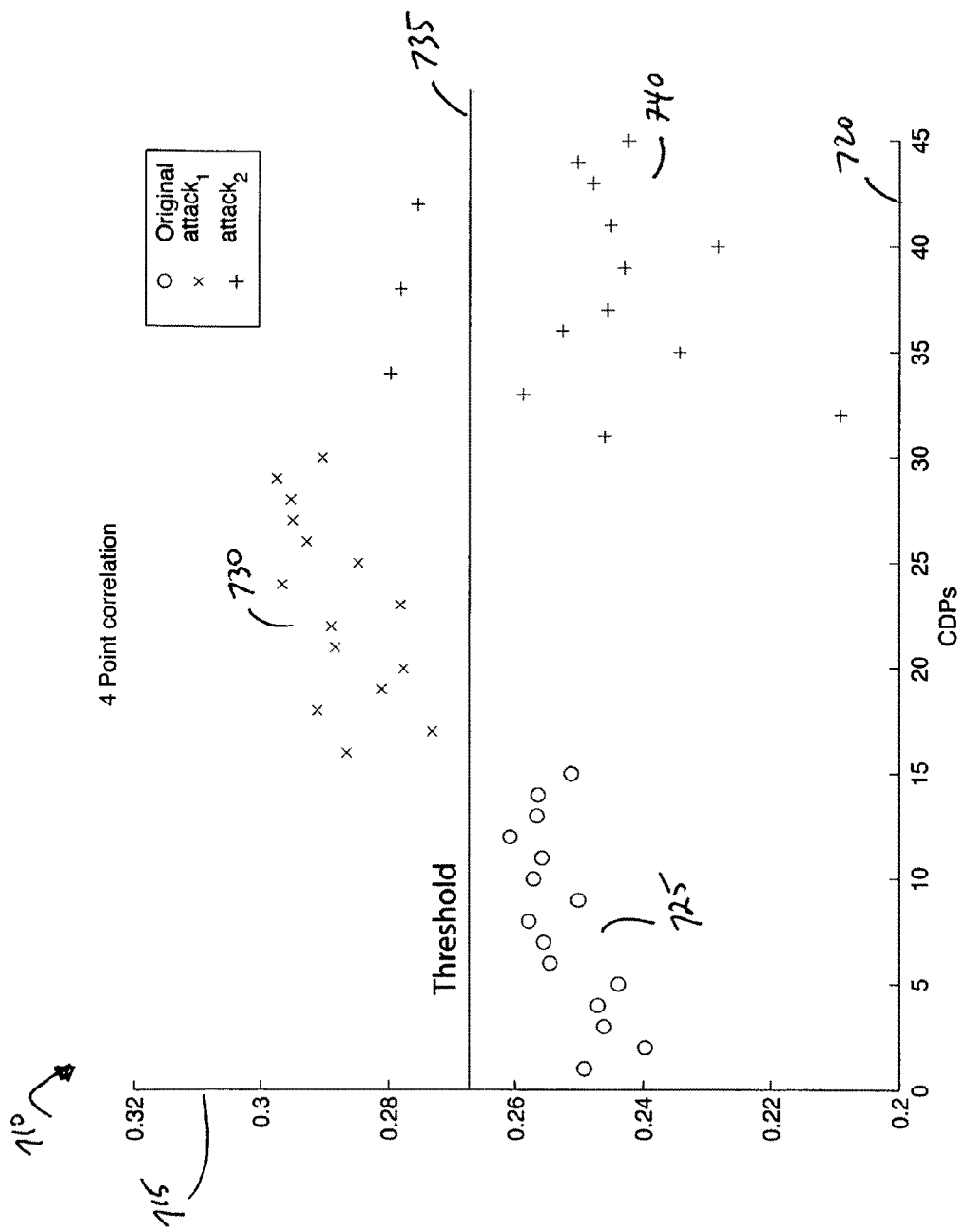
FIG. 7 is a graph illustrating multiple instances of two distinct copy detection tests using a four point correlation test for a sixth paper according to an illustrative embodiment of the present application.
Figure 8:
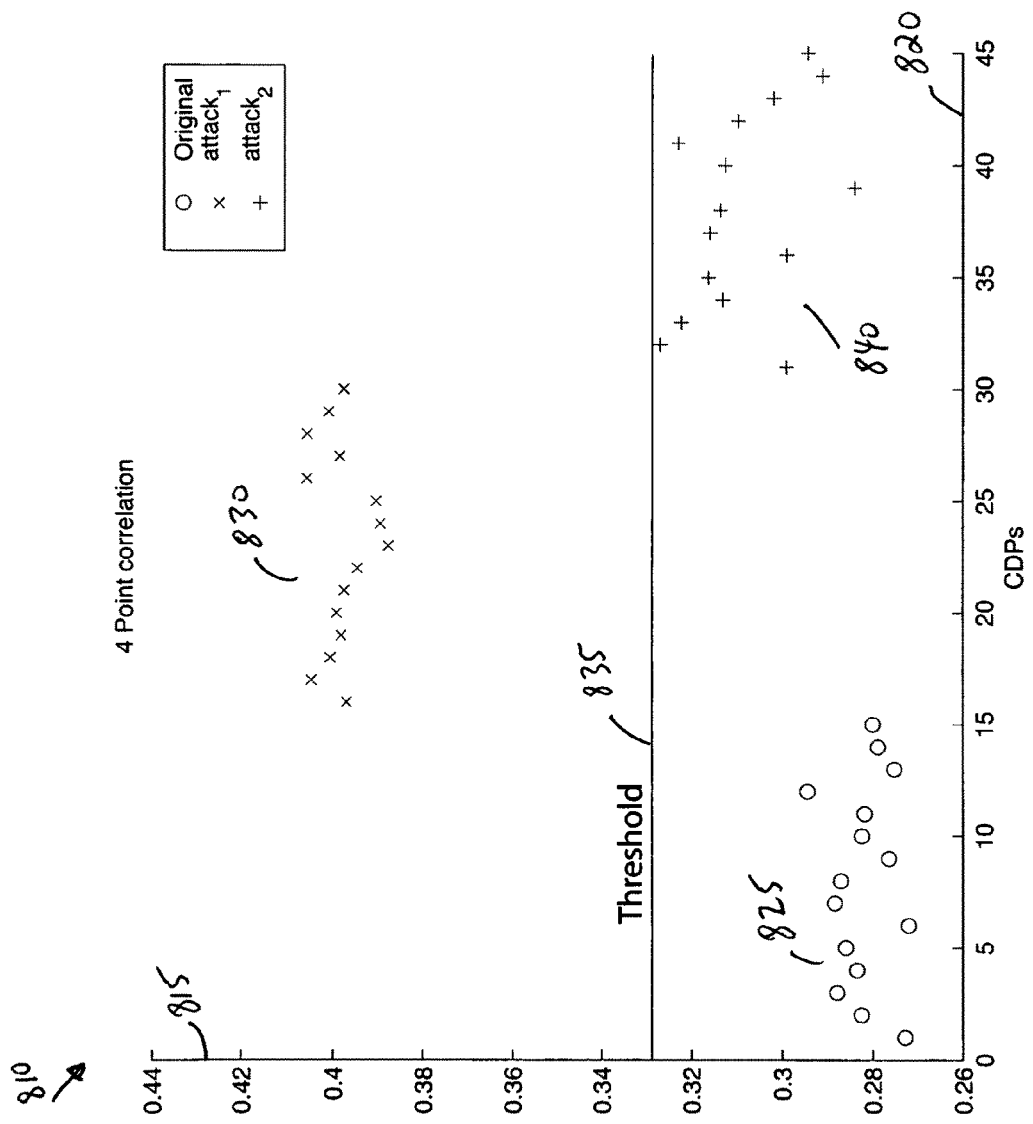
FIG. 8 is a graph illustrating multiple instances of two distinct copy detection tests using a four point correlation test for a seventh paper according to an illustrative embodiment of the present application.

Referring to FIGS. 7 and 8, a second detailed potential attack scenario against the 4 point correlation test on different papers is described. Even when the best paper is used (the experiments described herein utilized good quality white office paper and photo quality paper), an attacker can apply new sophisticated mathematical techniques of optimization (constraint optimization) to digitally transform a high quality scanned (legitimate) CDP into a CDP with autocorrelation close to zero. This CDP can then be re-printed and its scan has a correlation number with the reconstructed CDP above the threshold and an auto-correlation number below the threshold, that is, the copied CDP is detected as a legitimate one. This second attack is referred to herein as a "smart attack."

Referring to FIGS. 7 and 8, each provide a plot of original, first attack and second attack results 710 and 810. Each plot includes a "y" axis of 4 point correlation test values 715 and 815. Each plot includes an "x" axis that represents an individually numbered test (each vertical "slice" is a separate test) 720 and 820. Each plot includes original CDP test values 725 and 825. Each plot also includes the attack 1 CDP test values created by first making a high quality scan-print fraudulent copy and then testing 730 and 830. Each plot also includes the attack 1 CDP test values created by first making a high quality scan-print fraudulent copy and then testing 740 and 840. Finally, each plot has an experimentally defined threshold for the paper that in most cases provides complete selectivity between the original, attack 1 and the attack 2 tests 735 and 835.

The illustrative embodiments of the present application describe several verification test features that are much more robust over a variety of paper types and printing processes (ink-paper interaction) where the autocorrelation test fails. One test might be better than the other for one type of paper or another, or for one printing type or another, so using all or certain of these distinct tests together in one or more combinations provides a novel solution to the first attack problem across all or most media. Moreover, these new verification features are sufficiently different from each other so that an attacker cannot reasonably modify a high quality scan so as to optimize all of these features together. That is, one test feature might be optimized, but others will, with almost certainty, allow the novel verification systems described herein to detect the copy. Here again, the tests of combinations of tests described herein in an optimized system provide a novel solution to the second attack or smart attack problem.

In several embodiments herein, the overall copy detection test comprises two parts. First, an identification test is performed and then an authentication test is performed. In the identification test, a quality metric is used to detect whether the scanned CDP is valid or not. The identification test also measures the quality degradation of the CDP. Given a particular CDP, if the quality metric is lower than a predefined quality threshold it is assumed to be either an illegal copy or a fake CDP. However, if the given CDP passes the identification test, the dispersion on the CDP due to the print-and-scan is investigated for authentication purposes. In the illustrative embodiments herein, the identification test comprises a 4 point autocorrelation test. From print-and-scan model experiments, we can infer that the print-and-scan system can typically be modeled with a gaussian 2D FIR filter. This model can also be used to predict the amount of dispersion in the scanned CDP (CDP1). Thus, the authentication test features should be sensitive to inter-pixel correlations and blurriness of CDP pixels. The blurriness or sharpness of a particular image can be measured in transform domain. The image entropy is also related to the sharpness of the image. It is expected that the sharper the CDP, the higher its entropy. The definitions of new copy detection features which measures the blurriness of the CDP are provided in the following multi-point autocorrelation identification test (as a quality metric first authentication test) and the four new authentication tests. The five tests will also be grouped into three categories as described below. Test combination embodiments will then be described as individual or combinations of the identified tests or as a test selected from an articulated category.

Figure 9:
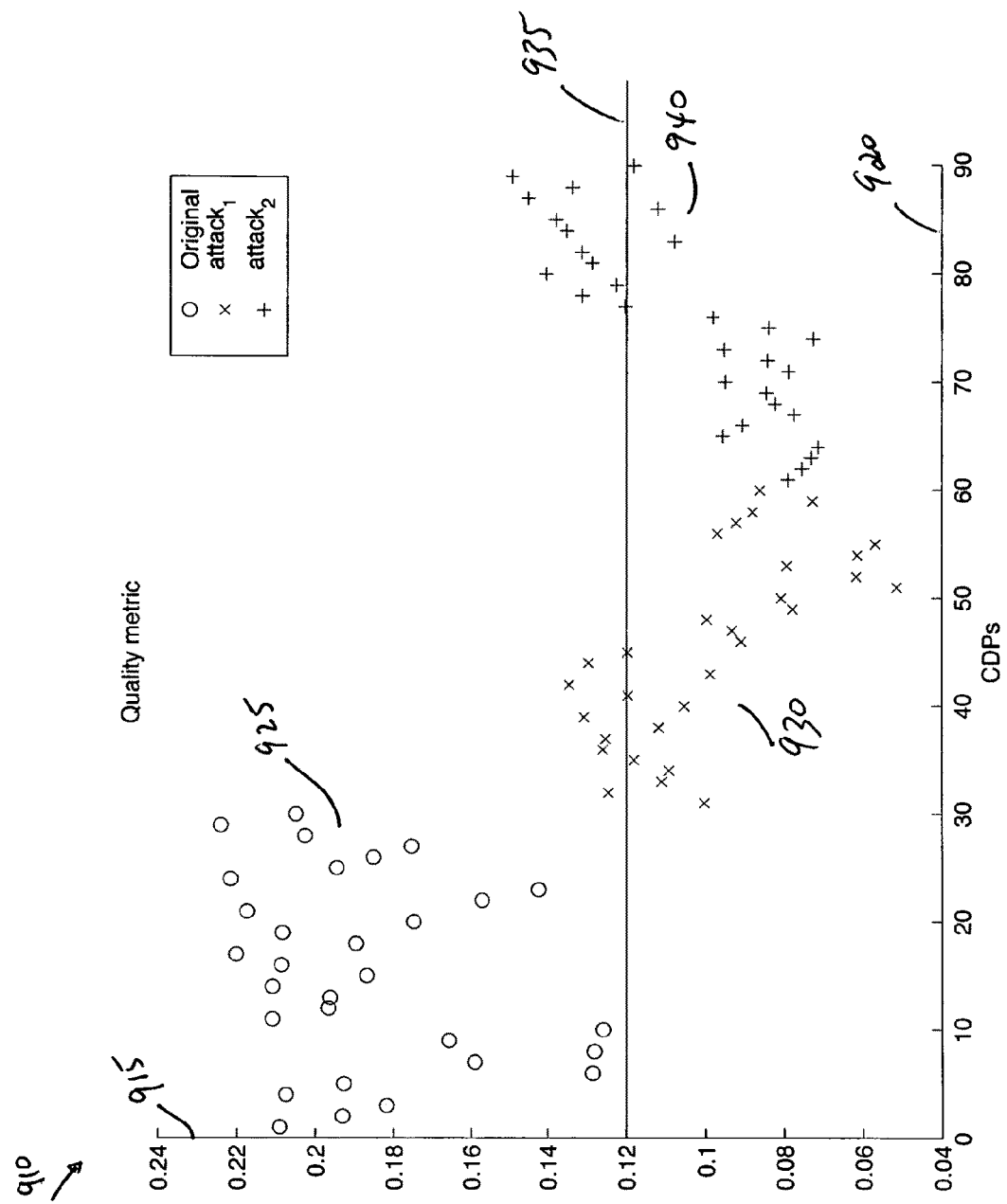
FIG. 9 is a graph illustrating multiple instances of two distinct copy detection tests using a quality index test according to an illustrative embodiment of the present application.

Referring to FIG. 9, a graph illustrating multiple instances of two distinct copy detection tests using a quality index test as a first test feature according to an illustrative embodiment of the present application is shown. Plot 910 provides original 925, first attack 930 and second attack 940 results against a quality metric test such as a 4 point autocorrelation including a threshold 935. The plot includes a "y" axis of 4 point correlation test values 915 and an "x" axis that represents an individually numbered test 920.

The first test feature is a quality metric test that makes use of the original CDP autocorrelation identification test. The quality index (that is, the correlation number between the recreated CDP and the scanned one), although primarily used for identification purpose, can still be used (in a lesser degree) for detecting an illegitimate copy. Furthermore, other features such as the mean square error between the two CDPs, or the mutual entropy can also be successfully used as an alternative. This first test feature is referred to as Category 1.

Figure 10:
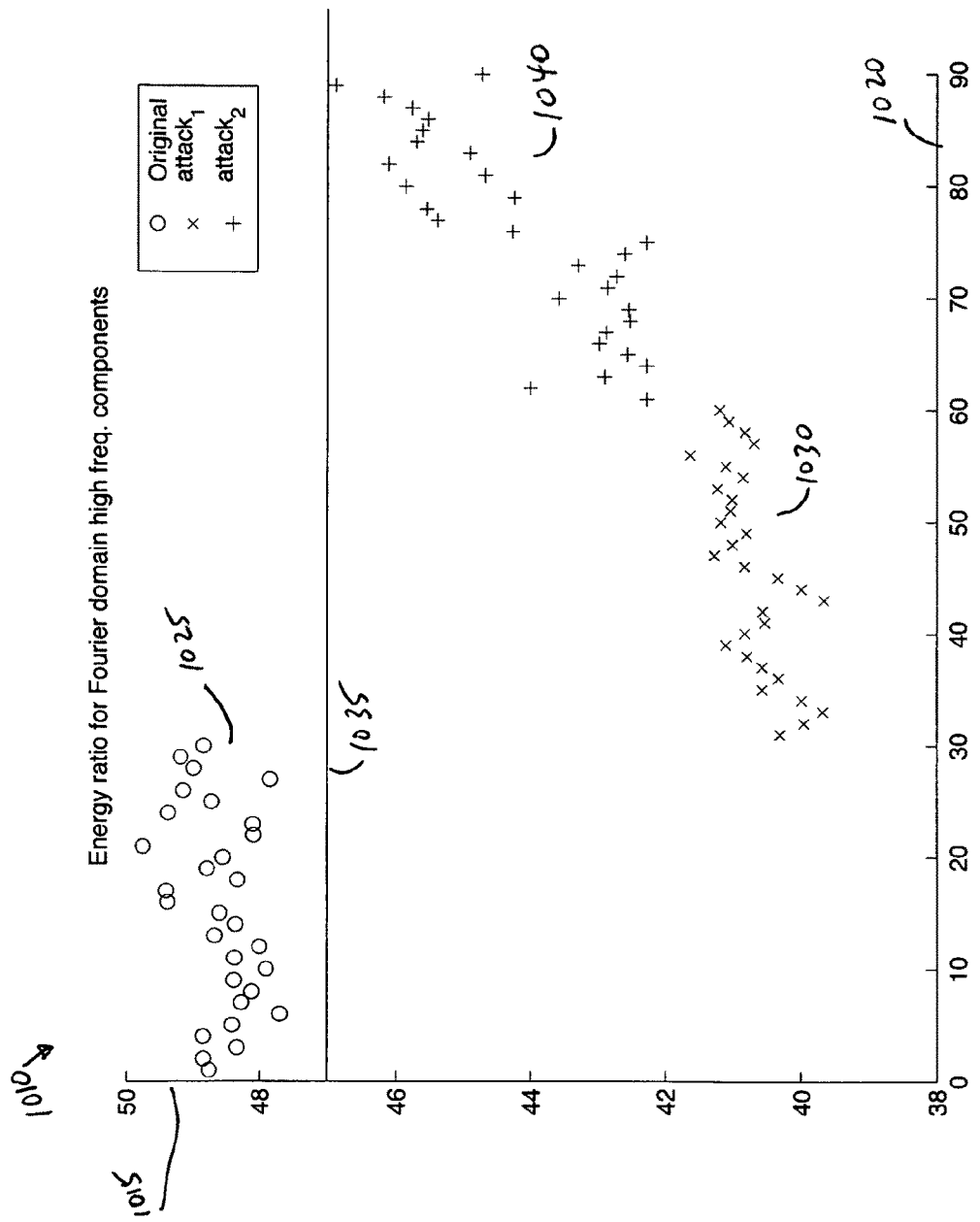
FIG. 10 is a graph illustrating multiple instances of two distinct copy detection tests using an energy ratio test according to an illustrative embodiment of the present application.

Referring to FIG. 10, a graph illustrating multiple instances of two distinct copy detection tests using an energy ratio test as a second test feature (Category 2) according to an illustrative embodiment of the present application is shown. Plot 1010 provides original 1025, first attack 1030 and second attack 1040 results against an energy ratio metric test for Fourier domain high frequency components including a threshold 1035. The plot includes a "y" axis of energy ratio test values 1015 and an "x" axis that represents an individually numbered test 1020. Test feature 2 comprises a CDP energy ratio test.

Figure 11:
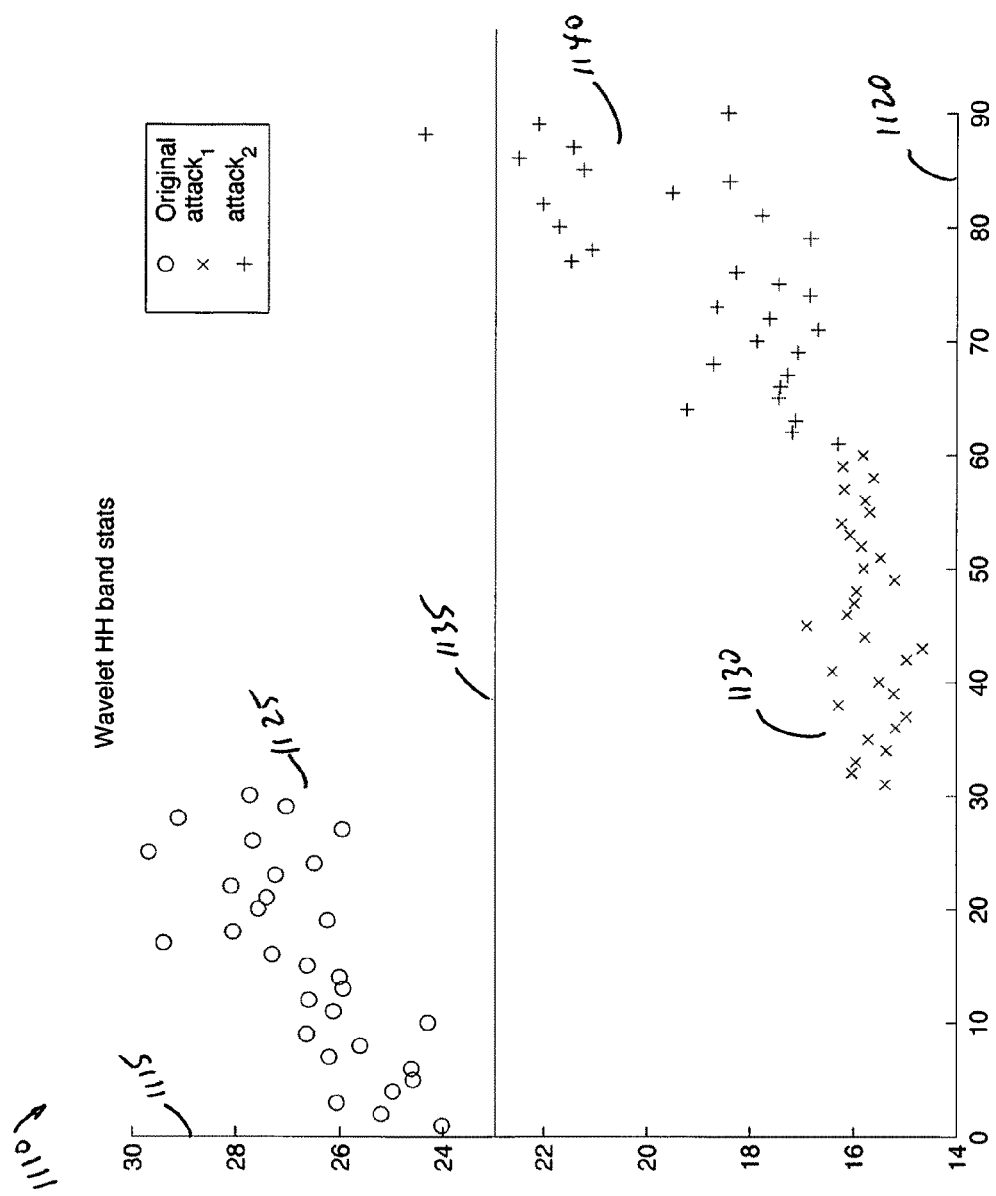
FIG. 11 is a graph illustrating multiple instances of two distinct copy detection tests using a wavelet test according to an illustrative embodiment of the present application.

Category 2 comprises test features measuring the blurriness resulting from the print-scan process including the second test feature of FIG. 10 and the third test feature of FIG. 11. With regard to the second test feature, an energy ratio is utilized. In the Fourier domain, the ratio of the energy in a window centered in the high frequency domain by the energy of the total image is a good measure of the sharpness of an image. Since the sharpness of the CDP decreases with print-scans, this energy decreases as well. It is therefore also a good detection feature. Within the test features of Category 2, there may be correlation.

Fourier transform is a good tool to analyze the frequency components of the 1D/2D signals. The underlying idea of the Fourier transform is that any integrable signal can be represented with the sum of several sinusoids. The output of the forward Fourier transform gives the amplitude and the phase information of the frequency components of a given signal. The 2D Fourier transform is defined as follows. Let x i,j represent the pixel values of a scanned CDP. M, and N is the dimensions of the x. The 2D discrete Fourier transform formula is as follows:

$$X_{u,v} = \sum_{m=0}^{M-1} \sum_{n=0}^{N-1} x_{m,n} e^{-i\frac{2\pi mu}{N}} e^{-i\frac{2\pi nv}{N}}$$

The blurriness/sharpness metric is defined as:

$$S_0 = \sum_{u=0+w}^{M-1-w} \sum_{v=0+2}^{N-1-w} |X_{u,v}|$$ (Eq. 1)

$$S_1 = \sum_{u=0}^{M-1} \sum_{v=0}^{N-1} |X_{u,v}|$$

$$F_{fourier}(cdp_x) = \frac{S_0}{S_1}$$

where, S0 is the sum of the magnitudes of the frequency components higher than w. This metric decreases with print-and-scan operations due to the energy loss of the high frequency components of the CDP.

Referring to FIG. 11, a graph illustrating multiple instances of two distinct copy detection tests using a wavelet test as a third test feature (Category 2) according to an illustrative embodiment of the present application is shown. Plot 1110 provides original 1125, first attack 1130 and second attack 1140 results against a wavelet HH band statistic metric test including a threshold 1135. The plot includes a "y" axis of wavelet HH band statistic test values 1115 and an "x" axis that represents an individually numbered test 1120.

Test feature 3 comprises a wavelet decomposition test applied to the CDP. Wavelet processes are known in the data compression arts. Here, first and second order statistics, especially the variance, of the sub-band coefficients is a good detection feature as it increases with multiple print and scans. Similar to the Fourier sharpness metric, we can also measure the blurriness of the CDP in wavelet domain. To do that, we first apply 2 level wavelet decomposition to the scanned CDP. Then, we take the standard deviation of the 2nd level HH sub-band coefficients as wavelet based metric. In wavelet decomposition, Daubechies 8 wavelets are used.

Figure 12:
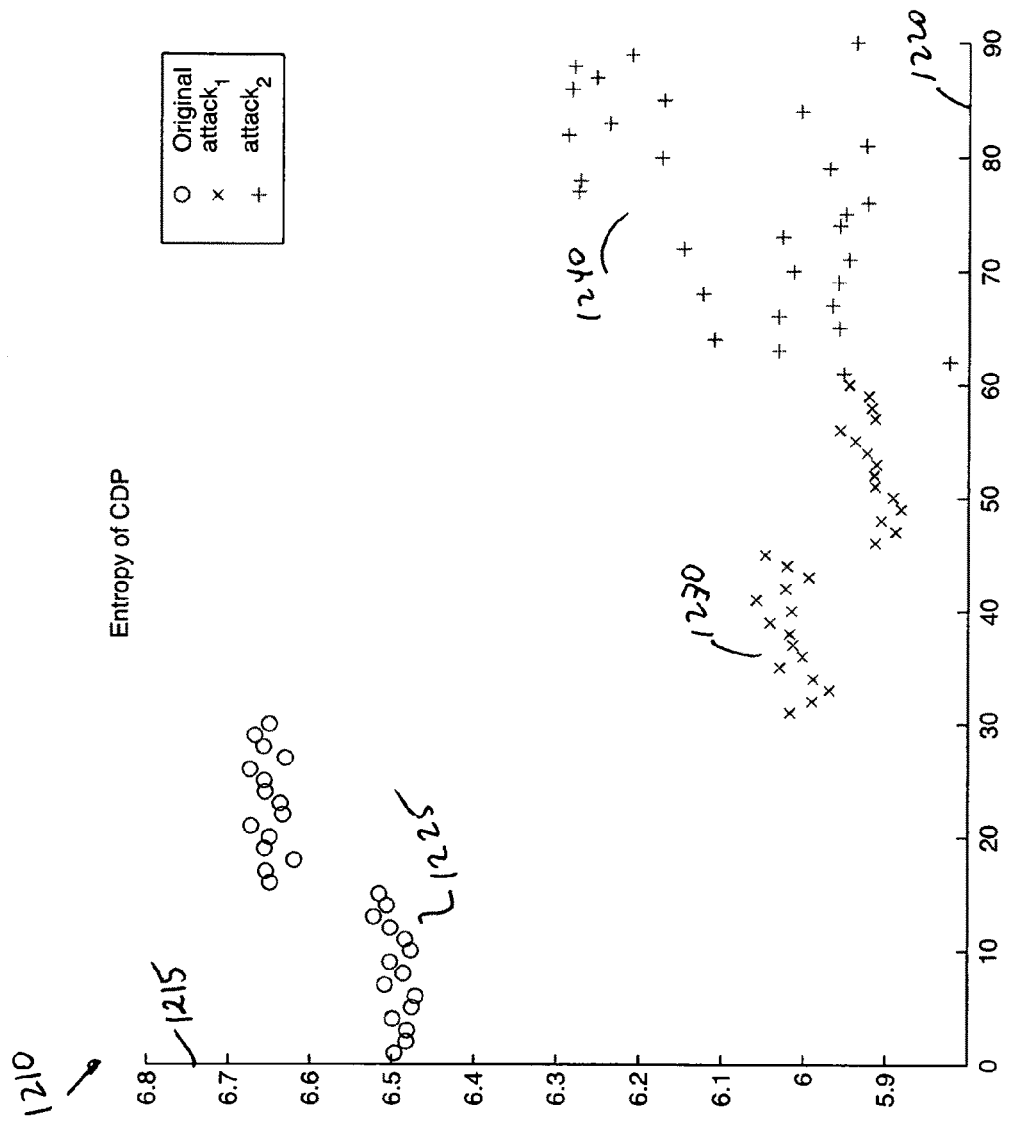
FIG. 12 is a graph illustrating multiple instances of two distinct copy detection tests using an entropy test according to an illustrative embodiment of the present application.
Figure 13:
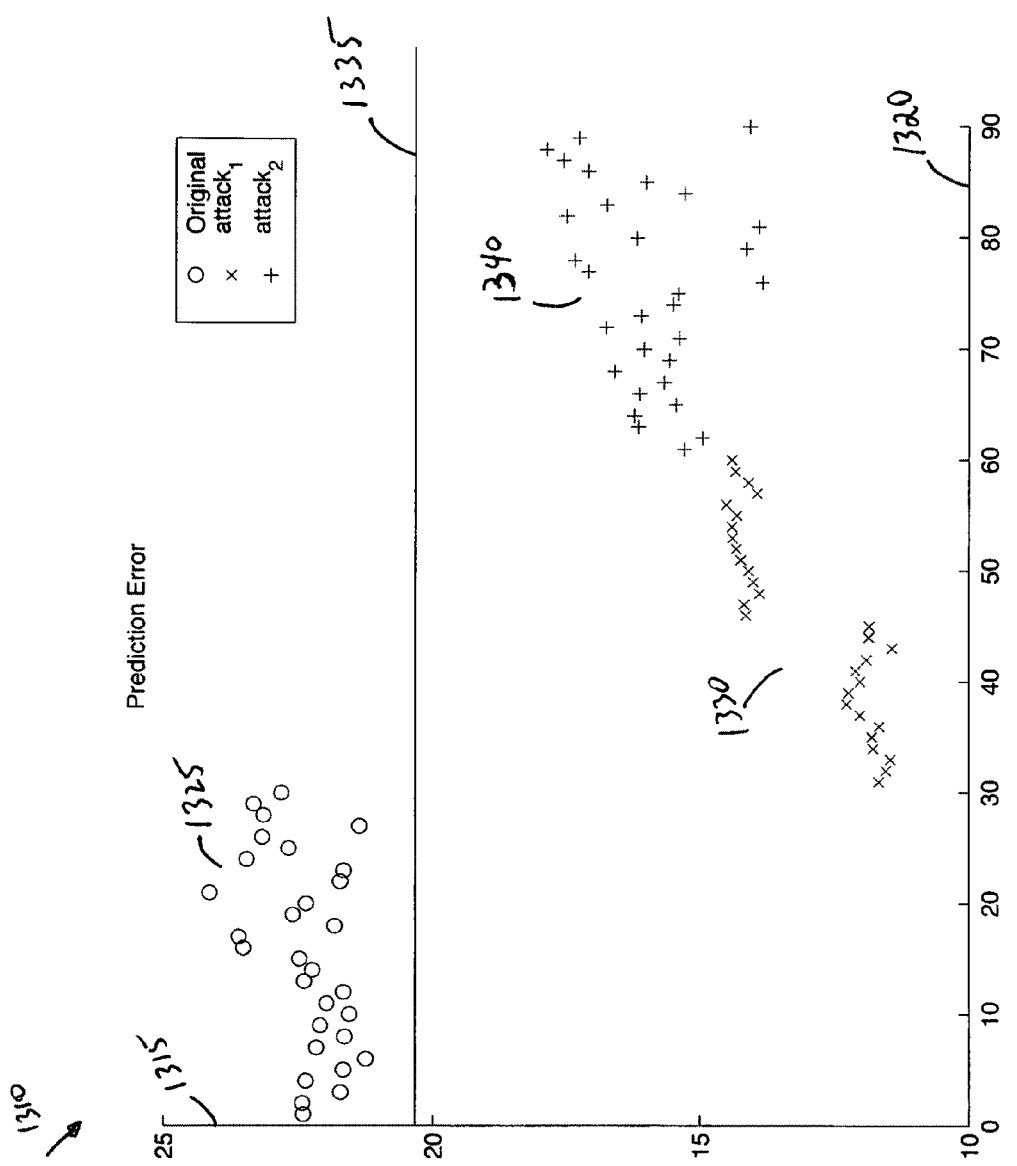
FIG. 13 is a graph illustrating multiple instances of two distinct copy detection tests using a prediction error test according to an illustrative embodiment of the present application.

Category 3 comprises test features measuring the loss of information due to the print-scan process including the fourth test feature of FIG. 12 and the fifth test feature of FIG. 13. Within the test features of Category 3, there may be correlation.

Referring to FIG. 12, a graph illustrating multiple instances of two distinct copy detection tests using an entropy test as a fourth test feature (Category 3) according to an illustrative embodiment of the present application is shown. Plot 1210 provides original 1225, first attack 1230 and second attack 1240 results against an entropy value metric test including a threshold 1235. The plot includes a "y" axis of entropy values 1215 and an "x" axis that represents an individually numbered test 1220. Test feature 4 comprises a CDP entropy test.

In information theory, entropy of a signal is defined as the measure of the amount of information which the signal carries. This is also called as Shannon Entropy. Let X is a vector of CDP pixels, and n is the number of elements of X. The entropy of X is defined as:

$$F_{entropy}(cdp_x) = -\sum_{i=1}^{n} p(x_i)\log_2 p(x_i)$$ (Eq. 2)

where p(xi)=Pr(X=xi) is the probability mass function of X. Entropy is also defined as the uncertainty. Since the print-and-scan process can be modeled as low pass filtering, we expect that each print and scan will reduce the entropy of the CDP for a certain amount. The entropy tends to decrease when the CDP is printed and scanned.

Referring to FIG. 13, a graph illustrating multiple instances of two distinct copy detection tests using a prediction error test as a fifth test feature (Category 3) according to an illustrative embodiment of the present application is shown. Plot 1310 provides original 1325, first attack 1330 and second attack 1340 results against a prediction error metric test including a threshold 1335. The plot includes a "y" axis of prediction error values 1315 and an "x" axis that represents an individually numbered test 1320. Test feature 5 comprises a CDP prediction error test. In test feature 5, the grey level of the scanned CDP can be "predicted" (with errors) as a linear combination of the grey levels of the neighboring pixels. Since the grey levels in the initial CDP are random, the total error is very large, but once the CDP is printed and scanned, the error decreases.

In digital signal processing, linear prediction or linear predictive coding (LPC) is used to predict the future values from the previous samples. If the samples of the signal are highly correlated with each other, the future value can be estimated with very good accuracy. Similar to LPC we will try to predict the CDP pixel values from their nearest neighbors. Although it is possible to find optimum prediction coefficients for given CDP, we will use same prediction coefficients for all CDPs. Let x i,j represents the CDP pixel value at location i and j. The prediction of x i,j can be defined as:

$$\hat{x}_{i,j} = (x_{i,j-1} + x_{j-1,i}) - (x_{i-1,j-1})$$ (Eq. 3)

The prediction error metric is defined as the difference between $x_{i,j}$ and $\hat{x}_{i,j}$:

$$F_{prediction}(cdp_x) = x_{i,j} - \hat{x}_{i,j}$$ (Eq. 4)

As autocorrelation metric increases by printing and scanning, the prediction error decreases. Thus, prediction error can be used a copy detection metric.

Several illustrative test systems implemented using the system of FIG. 1 are described. In one illustrative configuration, systems and methods for determining if a document is an original version are described. The system captures a CDP that may be skewed or improperly sized. The system then retrieves or reconstitutes the expected CDP. The system may process the CDP as scanned. However, in an alternative, in order to provide a more reliable comparison and without manipulating the captured CDP, the system manipulates the orientation or rotation and resolution or size of the retrieved or reconstituted CDP to more closely correspond to the skewed orientation and incorrect size of the captured CDP. Manipulating the expected CDP comprises at least one transformation including a 1 pixel shift transformation and may also comprise an n-pixel shift, wherein n is determined as the optimal correlation length using the printer resolution and the scanner resolution.

The system then performs an identification test to ensure that the correct CDP is under test. Then one or more authentication tests are preformed to determine if the document is an original version. The authentication tests may be selected from a quality index, an entropy test, a Fourier domain sharpness test, a wavelet domain sharpness test and a prediction error metric test. Accordingly, the test comprises an identification test followed by one other test from any of Category 1, 2 or 3. In an alternative, just the authentication test is performed on the CDP selected from any of Category 1, 2 or 3. In another alternative embodiment, the test comprises an identification test followed by one test from Category 2 and one test from Category 3. In yet another alternative, the test comprises one test from Category 1 followed by one test from Category 2 and one test from Category 3. In yet another alternative, the test comprises one test from Category 1 and then one test from either Category 2 or Category 3.

In a further illustrative configuration, the authentication tests may be grouped into distinct orthogonal test group categories. If a test in one category provides an inconclusive result, then a test from an orthogonal category may be used to provide a more accurate test. In yet a further illustrative configuration, a subset of authentication tests applied may be selected according to a selection parameter that may be determined using one or more of a usefulness parameter, a system throughput/speed parameter and/or a target document valuation parameter. Alternatively, one or more authentication tests may be randomly selected. For example, if Category 2 and Category 3 are orthogonal, a test comprises an identification test followed by one test from Category 2. If the test is inconclusive or otherwise not satisfactory, then another test selected from Category 3 is performed. In an alternative, the test comprises an identification test followed by one test from Category 3. If the test is inconclusive or otherwise not satisfactory, then another test selected from Category 2 is performed. Several additional alternative configurations are also described below.

In another alternative embodiment, the five tests are all performed on the CDP and an "authentic" 5 dimension space is defined. In a "deterministic" embodiment, a multi-dimensional "verification" space. The five test features can be extracted in experimental data, and together with pattern recognition techniques (like Support Vector Machines) they can be used to define a closed "legitimacy region" in a 5 dimensional space and a boundary of this region. When a printed CDP is scanned, the five features are extracted and a point is plotted in this space. The CDP is deemed legitimate or fraudulent according to the region in which the point falls. Moreover the distance between the point and the boundary can be used as a measure of the confidence that the decision is right.

On potential drawback of this "deterministic" embodiment is that the verification process is rather computation intensive (extraction of multiple features, determination of the (pre-computed) region in which the point falls, and optionally computation of the distance of this point to the boundary). Accordingly, depending on the volume of CDPs to be processed and the computing power available, such a test may be relatively too slow for a fast inline application with restricted computing power. Accordingly, another alternative group of "probabilistic" embodiments are provided for faster verification, typically for use in real time environment such as postal indicia verification.

Accordingly, in yet another illustrative embodiment, known as "probabilistic" embodiments, we construct verification thresholds for random or partially-random application (probabilistic embodiments). For each of the five test features (or a subset used in an alternative embodiment), a threshold is experimentally determined. Feature values are extracted from legitimate copies and from forged copies not optimized for that particular test feature. The histogram of the frequencies of these two set of values are plotted and the threshold is set so as to best separate these histograms. We extract only one test feature chosen from the available set at random, and test this one only against an experimentally pre-determined threshold for this test feature. Since the attacker does not know which feature will be checked, he/she cannot optimize the scanned CDP only for that feature. In alternatives, we partially randomly select two test features for use such as by randomly selecting one test each from Category 2 and Category 3.

However, these multiple test features are somewhat correlated (particularly so in a same category) so a uniform random distribution among the features may not be the best probabilistic test methodology. In yet another alternative, the probabilistic method is altered by choosing a hopefully more optimal random distribution as follows:

Let's do a linear transformation of each verification feature i so that the "passing range" (from the threshold $T_i$ to 1 or from 0 to $T_i$, accordingly) ranges now from 0 (worst) to 1 (best). Each passing value x for feature i defines a 5 dimensional section $S_{x,i}$ in the feature space. This section cuts the "legitimacy region" into a 5 dimensional region of volume $V_{x,i}$. For each feature i let $V_i$ be the weighted volume $\int x V_{x,i} dx$ over $0 \leq x \leq 1$. Alternatively $V_i$ can be computed as $\int f(x) V_{x,i} dx$ where f is a monotonously increasing function so that $f(0)=0$ and $f(1)=1$. The best feature to choose for the attacker is the one with highest $V_i$. So the verifier can set the probability $p_i$ of deciding on checking feature i as $p_i=V_i/V$ where $V=\Sigma V_i$.

Many alternative test compositions are contemplated herein. For example, a simple typical test protocol would be to use one test for each category (Correlation with original CDP, Energy ratio in Fourier domain, and Entropy) since the 3 categories are somewhat orthogonal to each other. The test weight applied to create a single composite threshold test value is (1/3,1/3,1/3) or another appropriate weighting. In an alternative, experimental testing is first performed on a large sample of items (legitimates+copies) to determine the weights that give fewer false positives (detected illegitimate while being legitimate) or fewer false negatives (not detected while being illegitimate). In another representative test weighting applied for one selected test from each of Category 1, 2 and 3, respectively, weights (0.2, 0.35, 0.45) are used.

In yet another alternative, the verification system of FIG. 1 uses all five tests. For example, in a slower forensic application, the test system may not be constrained by time and computing power constraints. Accordingly, the test protocol starts with five test equally distributed, but as test results are available to learn about the efficiency of each test, the system uses that feedback to modify the weights. Another alternative embodiment comprises inline verification. Take for example a formula that ranks the test in order of accuracy and speed. For example rank i=2*a_i+3 s_i can be the rank of the ith test. Then as constraints become heavier (like the frequency of input data increases), tests of lower ranks are dropped. When conditions become better they are included again. Accordingly, this embodiment provides a dynamic conditional system that varies the test applied according to it usefulness given the changing parameters of the items under test. For example, if more items of lower value are being testes, the slower more accurate tests are dropped. Here, test selection parameters are applied. Each test is assigned a usefulness parameter (that can be a 50/50 blend of relative speed and relative accuracy among the tests) (alternatively, separate speed and accuracy parameters are used), a system throughput parameter and a target document valuation parameter. A relative usefulness parameter based upon speed and accuracy is shown below in TABLE 1. Relative speed or relative accuracy can also be used separately as a usefulness parameter or combined 25/75 when speed is less important (higher value documents) and 75/25 when accuracy is less important (low value, high volume documents). In this example, Category 1 tests are not ranked, but could be ranked fastest and least accurate.

TABLE 1

| Test | Category | Relative Speed | Relative Accuracy | Usefulness |
| --- | --- | --- | --- | --- |
| 2. FFT | 2 | 1 | 4 | 4 |
| 3. Wavelets | 2 | 3 | 3 | 2.5 |
| 4. Entropy | 3 | 2 | 1 | 1 |
| 5. Error Prediction | 3 | 4 | 2 | 2.5 |

Figure 14A:
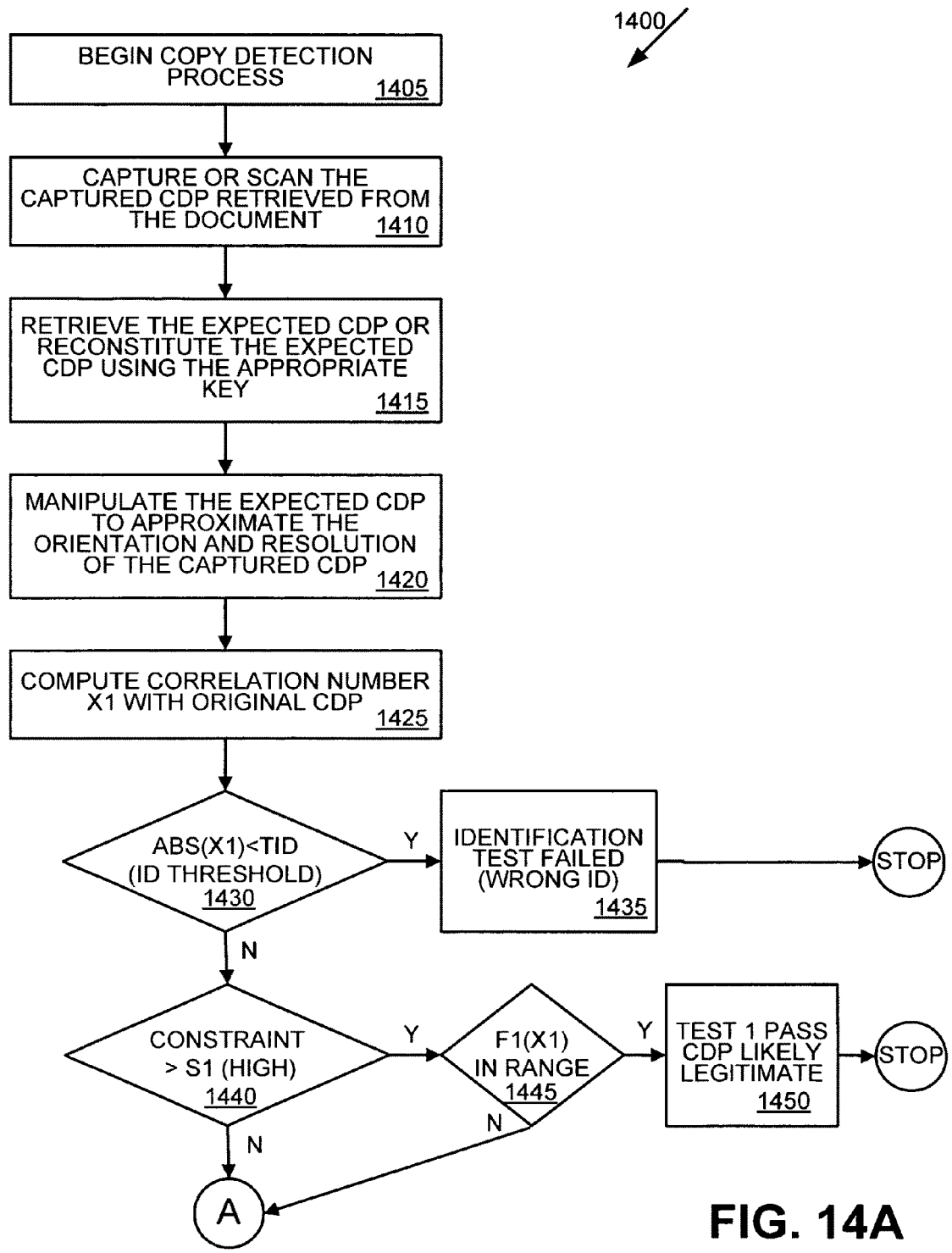
FIGS. 14A and 14B are a flowchart showing a method for detecting copies of documents according to an illustrative embodiment of the present application.
Figure 14B:
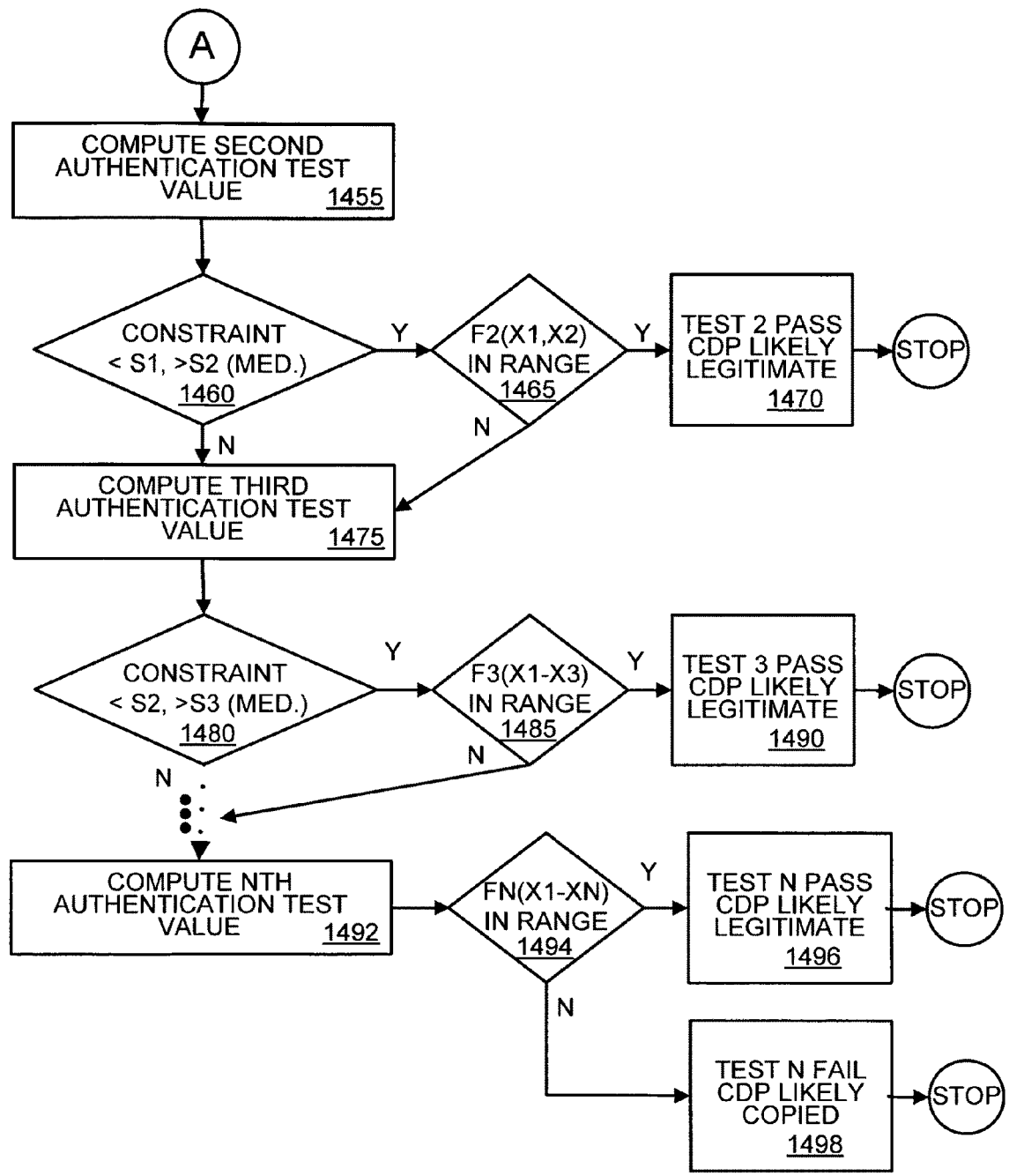

Referring to FIGS. 1 and 14A, 14B, an illustrative cascading test framework 1400 embodiment is described. In step 1405, the copy detection process begins on computer 30. In step 1410, the system captures or scans the captured CDP retrieved from the document under test. In step 1415, the system retrieves the expected CDP using the appropriate key or by other methods described or referred to herein. In step 1420, the system manipulates the expected CDP to approximate the orientation and resolution of the captured CDP. In step 1425, the system computes a correlation number X1 with the original CDP. In step 1430, a test is performed to determine if the absolute value of X1 is less than the ID threshold TID. If so, the identification test failed for a wrong ID and the process can stop. Here, the identification test is the fastest test and therefore, it is performed first to avoid other slower tests for the cases in which the document under test fails.

If the ID test passes, then the system tests constraint 1 in step 1440. The authentication test order after the identification test may be based upon any of the test order selection methods described or referred to above. The test order is in reverse speed order, so a fast test constraint will drop though all the way to the final authentication test as its only test. If the constraint value is greater than S1 (high), then a slow, accurate test is desired. The constraint that drives S1 high could be a very valuable document, unlimited computing power, low volume and/or forensic testing. Therefore, the value X1 is tested against a quick test range (presumably a somewhat strict test standard in this embodiment). If the X1 first test is in the pass range 1t 1450, the test stops and indicates a likely legitimate document.

If the constraint is less than or equal to S1 or if X1 is not in range in step 1445, then the system proceeds to compute the second authentication test value X2 in step 1455. If the constraint value is in a first medium range <S1, >S2, then the process attempts a second quick exit point at test 1465. If tests X1 and X2 are both in the pass range in step 1465 (presumably strict values), then the process indicates a likely legitimate document in step 1470 and ends.

Based upon a similar constraint test, the third test value is computed in step 1475 and tested in steps 1480, 1485 and 1490. Similarly, the system will under the appropriate constraint parameters (high volume, low compute capability or low document value (some false positive legitimate readings might be tolerated)), proceed straight through to the last test in step 1492. The last test is examined in step 1494. If the final test passes, then in step 1496, the system indicates a likely legitimate document and ends. If not, the process proceeds to step 1498 and indicates a likely illegitimate document and ends.

The systems and processes described or referred to in application Ser. No. 61/100,530 are incorporated herein by reference in there entirety. The disclosure there provides additional detail regarding embodiments described herein. Moreover, in an alternative applicable to any of the relevant embodiments herein, any of the embodiments therein or portions thereof may be combined with the embodiments herein as would be known by one of skill in the art practicing the teachings herein. While improved novel CDP tests and test combinations are the primary focus above, novel attack processes may also be disclosed herein.

While several embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A computer implemented method for determining if a document is an original version comprising:
   receiving, at the computer, a captured copy detection pattern (CDP) from a document to be verified;
   obtaining, using the computer, an expected CDP;
   manipulating, using the computer, the expected CDP to create a manipulated expected CDP;
   performing, using the computer, an identification test using the captured CDP and the manipulated expected CDP to determine an identification test parameter;
   upon the identification test parameter indicating passed identification, establishing, by the computer, the type of paper and the printing process used in the document;
   based on the established paper type and printing process, selecting, by the computer, at least one authentication test from a group of authentication tests consisting of an entropy test, a wavelet domain sharpness test and a prediction error metric test;
   performing the at least one authentication test using the captured CDP and the manipulated expected CDP to determine an authentication test parameter; and
   using the authentication test parameter to determine if the document is an original version.

2. The method according to claim 1, further comprising:
   performing at least two of the plurality of authentication tests to determine at least two authentication parameters, wherein each of the at least two of the plurality of authentication tests is different from each other and selected from the group consisting of an entropy test, a wavelet domain sharpness test and a prediction error metric test; and determining if the document is an original version if the at least two authentication parameters passes according to a predetermined threshold area.

3. The method according to claim 1, wherein:

the at least one authentication test consists of at least two authentication tests, further comprising, selecting at least one of the at least two authentication tests from the group consisting of an entropy test, a fourier domain sharpness test, a wavelet domain sharpness test and a prediction error metric test using a selection parameter.

4. The method according to claim 1, wherein:

the plurality of authentication tests comprises a first group of authentication tests and a second group of authentication tests that are orthogonal to each other.

5. The method according to claim 4, further comprising:

performing at least one of a plurality of authentication tests in the first group of authentication tests; and if performing the at least one of a plurality of authentication tests in the first group of authentication tests is conclusive, then halting the test, and if performing the at least one of a plurality of authentication tests in the first group of authentication tests is inconclusive, then performing at least one of a plurality of authentication tests in the second group of authentication tests to determine if the document is an original version.

6. The method according to claim 1, further comprising:

receiving a captured copy of data from the document that is to be protected.

7. The method according to claim 2, wherein:

manipulating the expected CDP comprises at least one transformation including a 1 pixel shift transformation.

8. The method according to claim 1, further comprising:

randomly selecting the at least one of the plurality of authentication tests.

9. The method according to claim 2, wherein:

manipulating the expected CDP comprises at least one transformation including an n-pixel shift, wherein n is determined as the optimal correlation length using the printer resolution and the scanner resolution.

10. The method according to claim 1, wherein:

manipulating the expected CDP includes registering the expected CDP to the captured CDP.

11. The method according to claim 1, further comprising:

selecting a selection parameter selected from among the group consisting of a usefulness parameter, a system throughput parameter and a target document valuation parameter; and selecting the at least one authentication test from among the plurality of authentication tests using the selection parameter.

12. The method according to claim 1, wherein:

the expected CDP data is obtained by reconstituting the expected CDP data from an appropriate key.

13. The method according to claim 3, wherein:

the expected CDP data is obtained by reconstituting the expected CDP data using the captured copy of data from the document that is to be protected.

14. The method according to claim 13, further comprising:

determining that the document is an authentic original copy if the captured CDP passed the identification test and at least two authentication tests.

15. The method according to claim 1, wherein:

the document is a portion of a document that includes protected data.

16. The method according to claim 1, wherein selecting the at least one authentication test is based upon at least one of a respective relative speed value and a relative accuracy value associated with each of the respective entropy test, the wavelet domain sharpness test and the prediction error metric test.

* * * * *